C. F. HAKE, Jr., AND A. MILL, Sr.
MACHINE FOR FORMING CAN BODIES.
APPLICATION FILED OCT. 14, 1919.

1,389,349.

Patented Aug. 30, 1921.
21 SHEETS—SHEET 1.

Inventors
Charles F. Hake Jr.
Anton Mill Sr.

Walter F. Murray Attorney

C. F. HAKE, Jr., AND A. MILL, Sr.
MACHINE FOR FORMING CAN BODIES.
APPLICATION FILED OCT. 14, 1919.

1,389,349.

Patented Aug. 30, 1921.
21 SHEETS—SHEET 2.

C. F. HAKE, Jr., AND A. MILL, Sr.
MACHINE FOR FORMING CAN BODIES.
APPLICATION FILED OCT. 14, 1919.

1,389,349.

Patented Aug. 30, 1921.
21 SHEETS—SHEET 5.

Inventors
Charles F. Hake Jr.
Anton Mill Sr.
By Walter F. Murray
Attorney

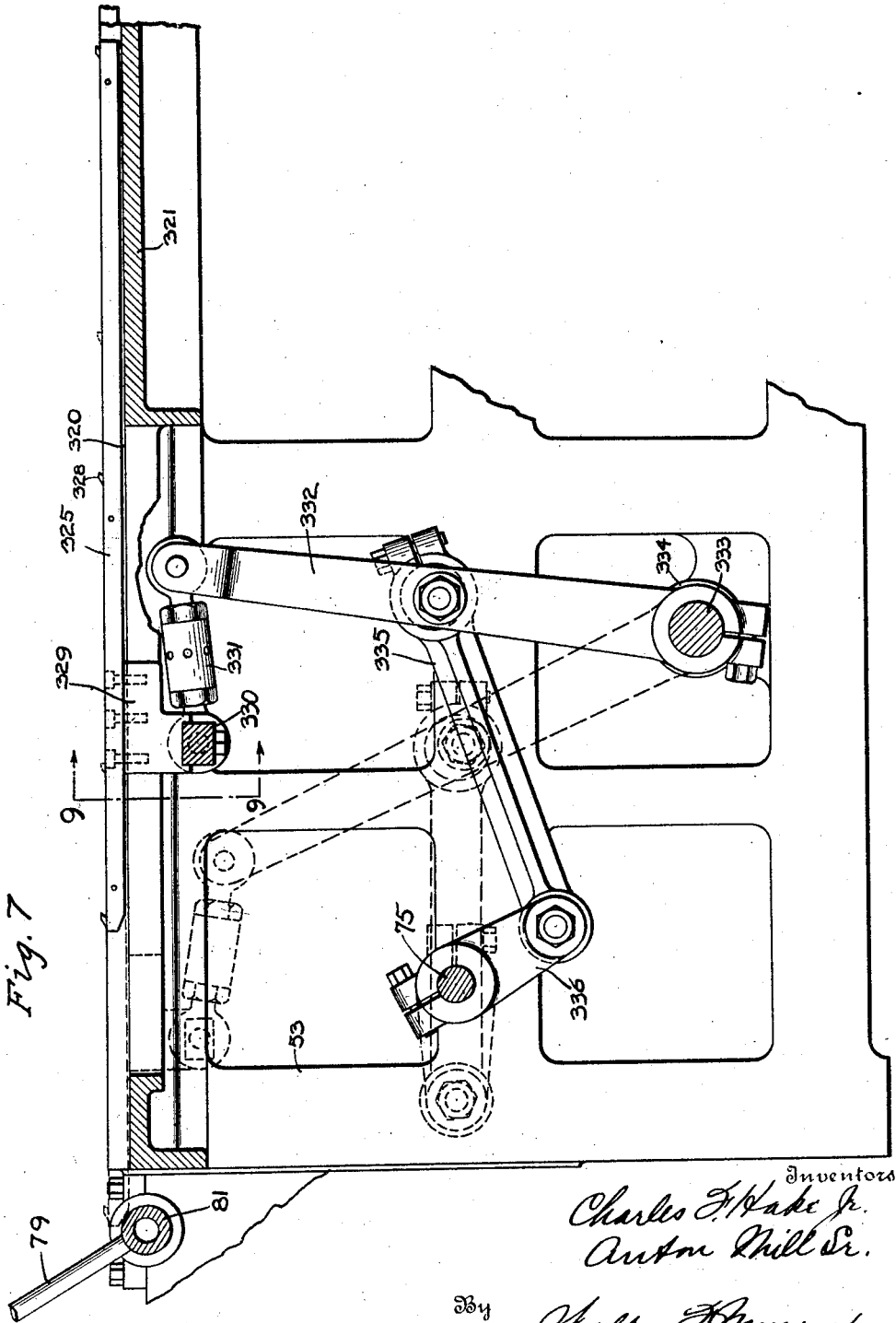

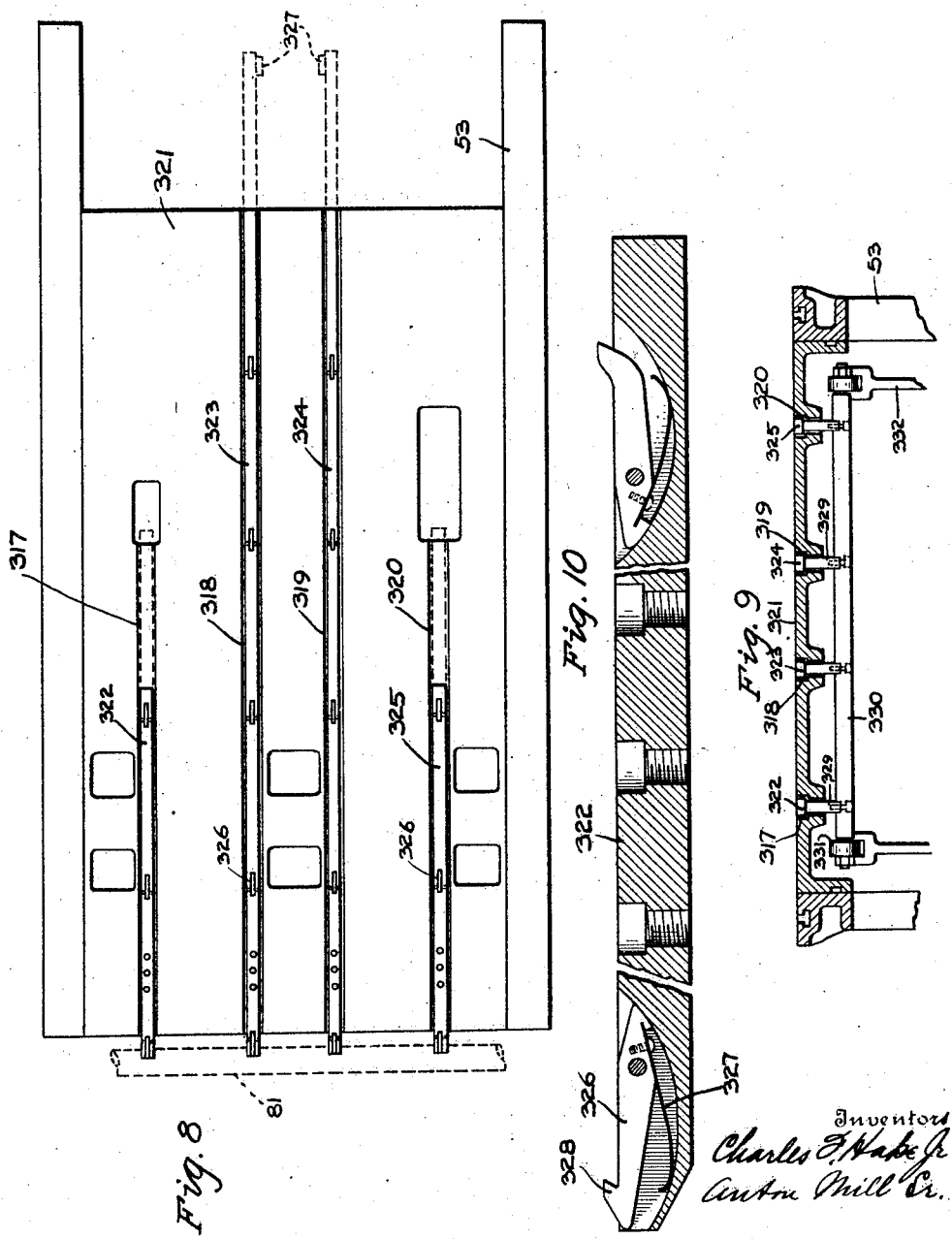

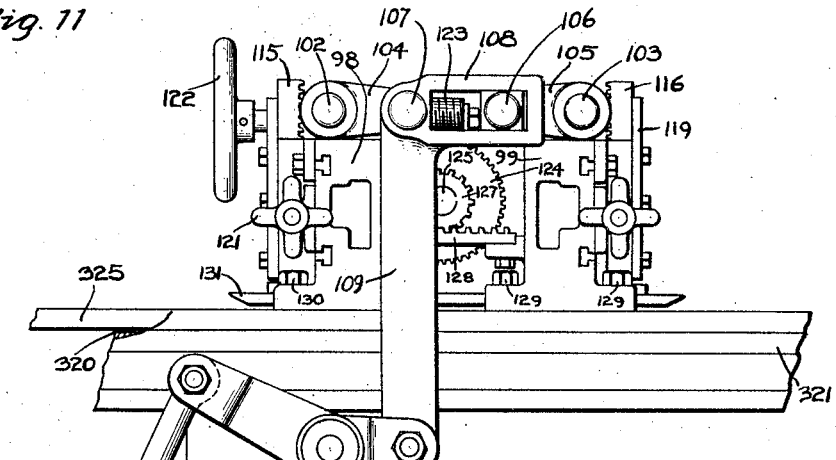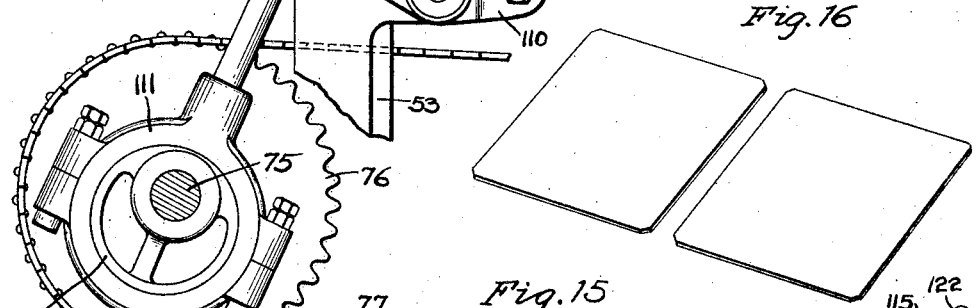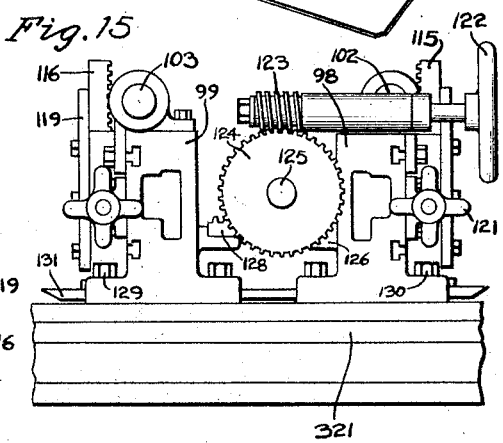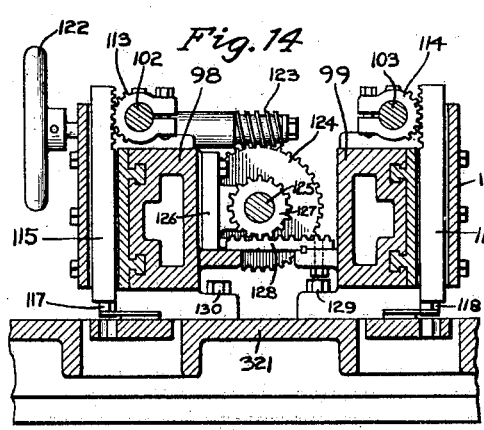

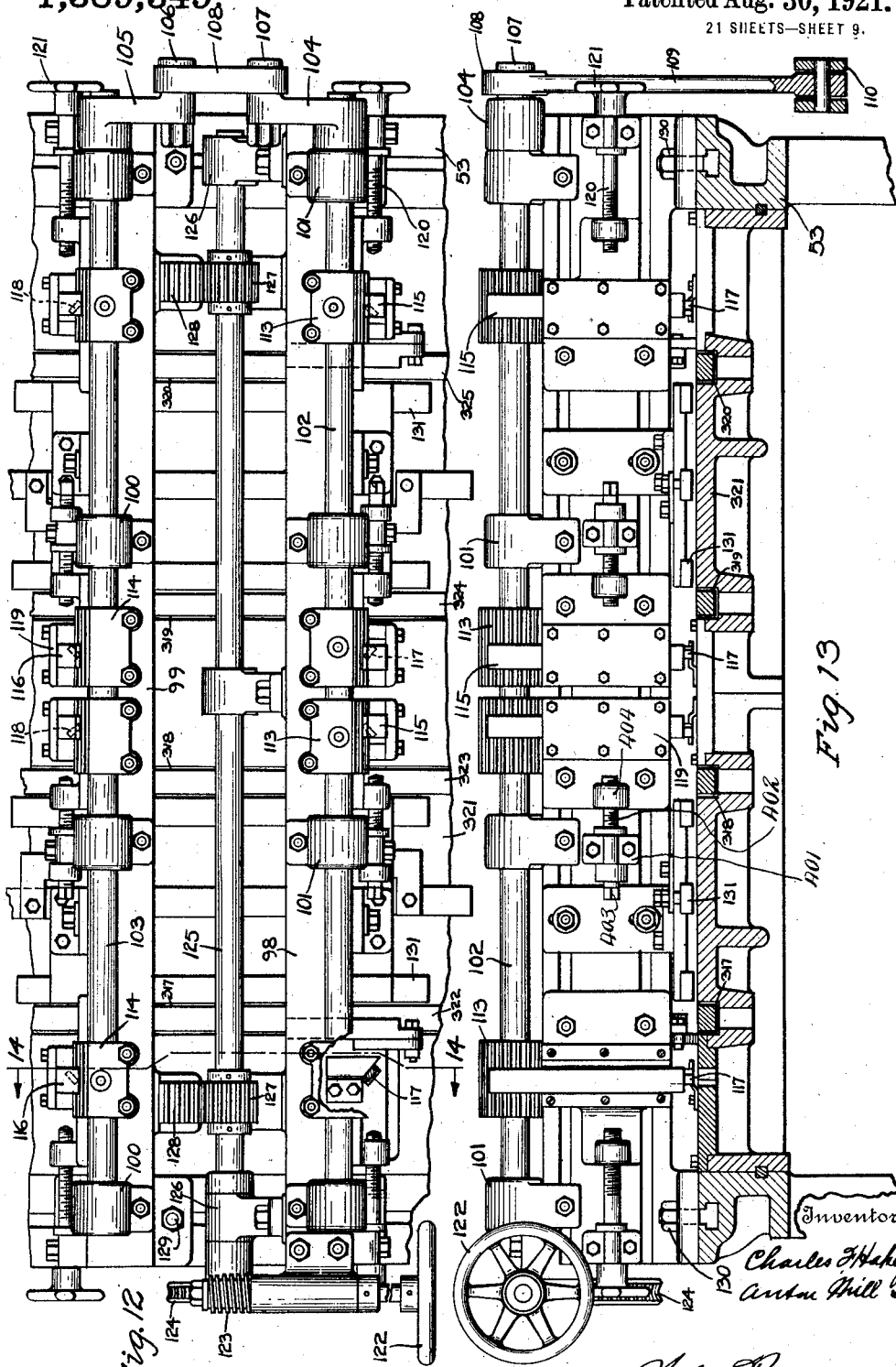

C. F. HAKE, Jr., AND A. MILL, Sr.
MACHINE FOR FORMING CAN BODIES.
APPLICATION FILED OCT. 14, 1919.
1,389,349.
Patented Aug. 30, 1921.
21 SHEETS—SHEET 10.
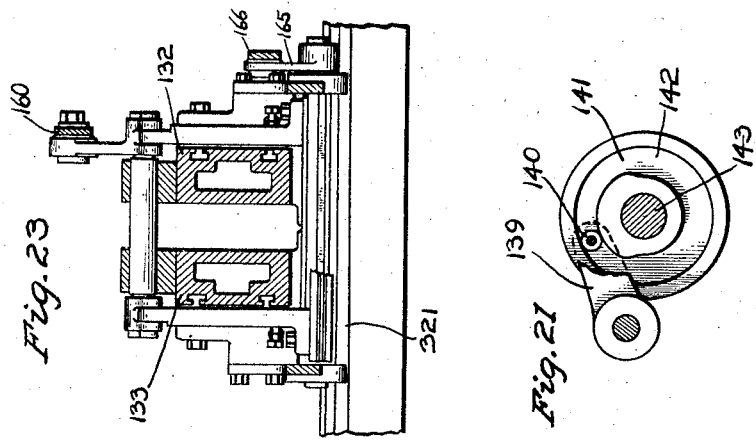
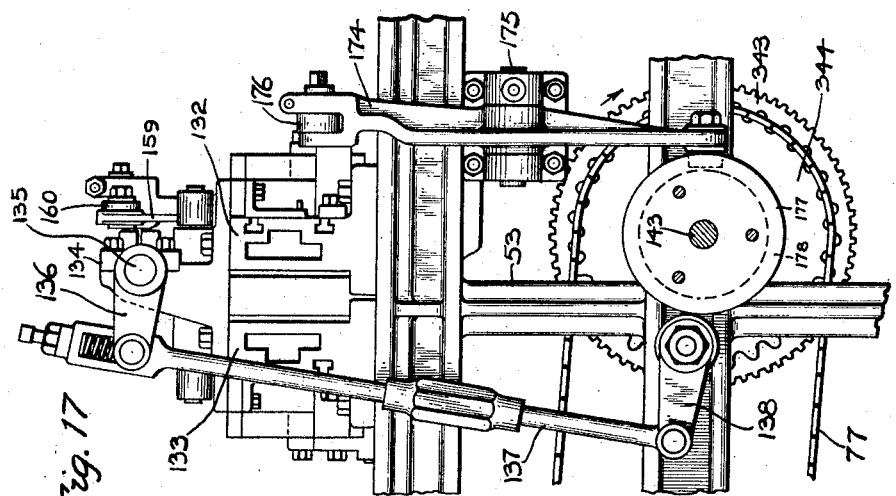
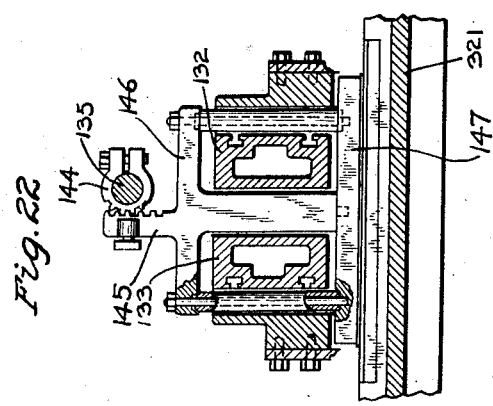
Inventors
Charles F. Hake Jr.
Anton Mill Sr.
Walter F. Murray
Attorney C. F. HAKE, Jr., AND A. MILL, Sr.
MACHINE FOR FORMING CAN BODIES.
APPLICATION FILED OCT. 14, 1919.
1,389,349.
Patented Aug. 30, 1921.
21 SHEETS—SHEET 11.
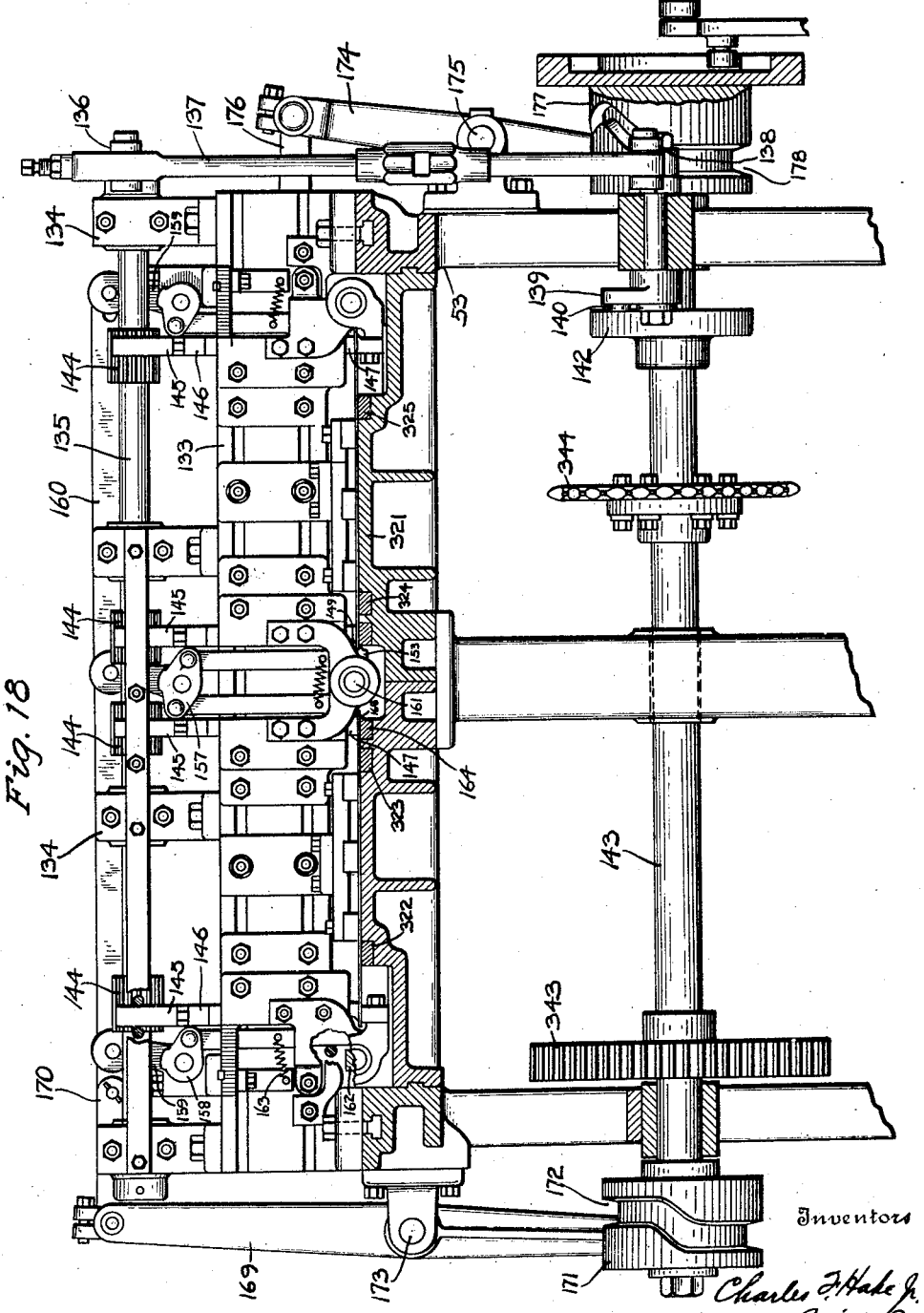

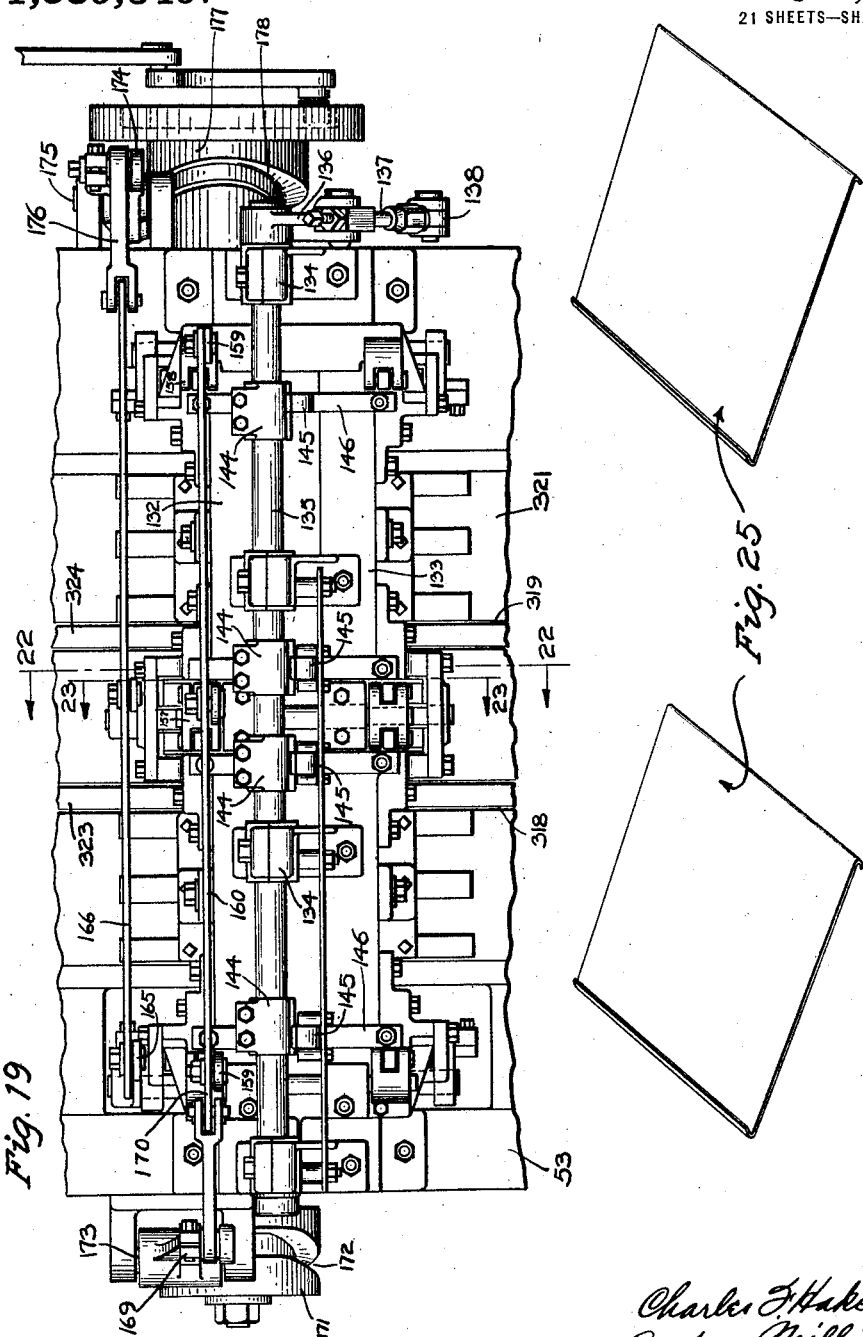

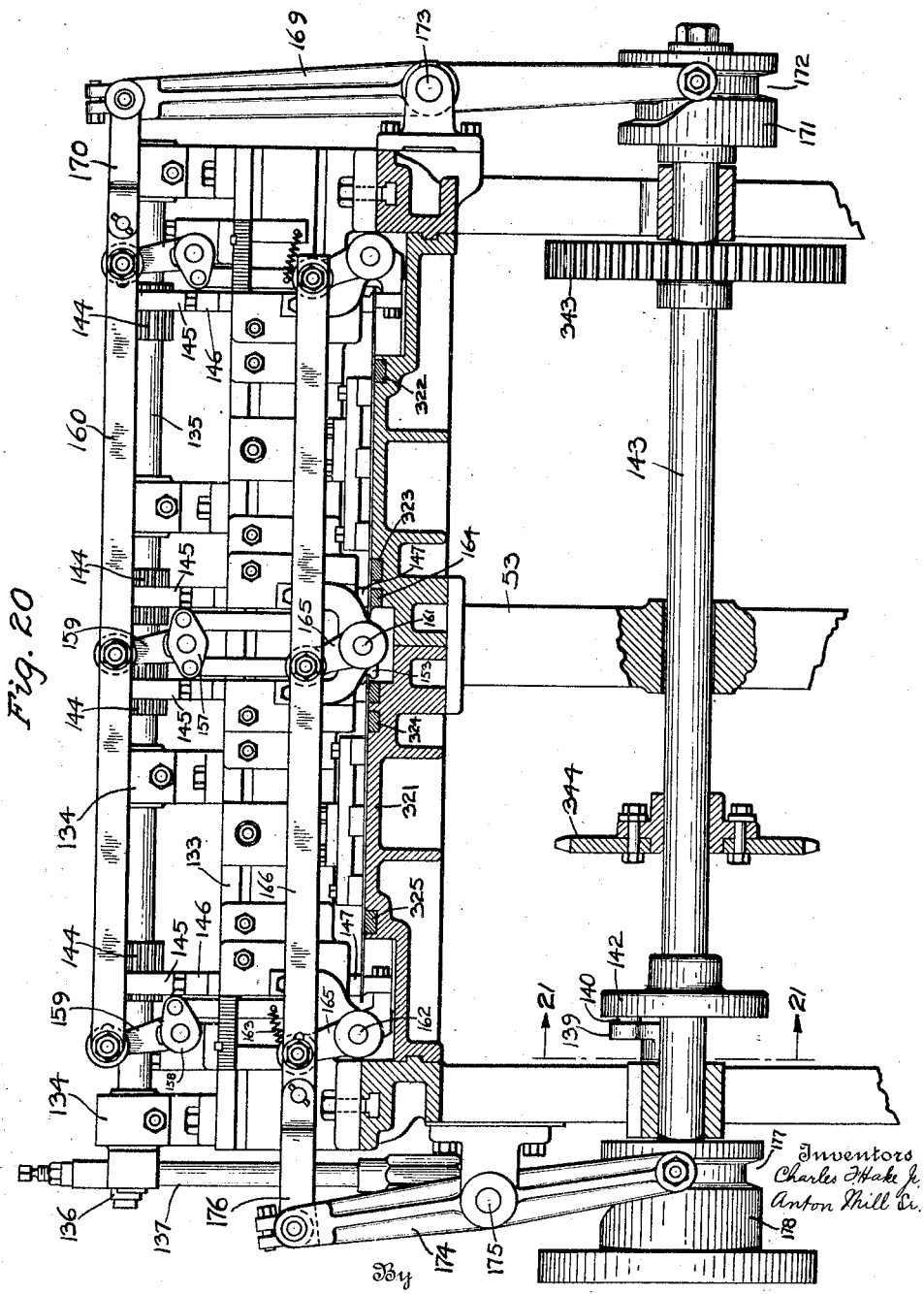

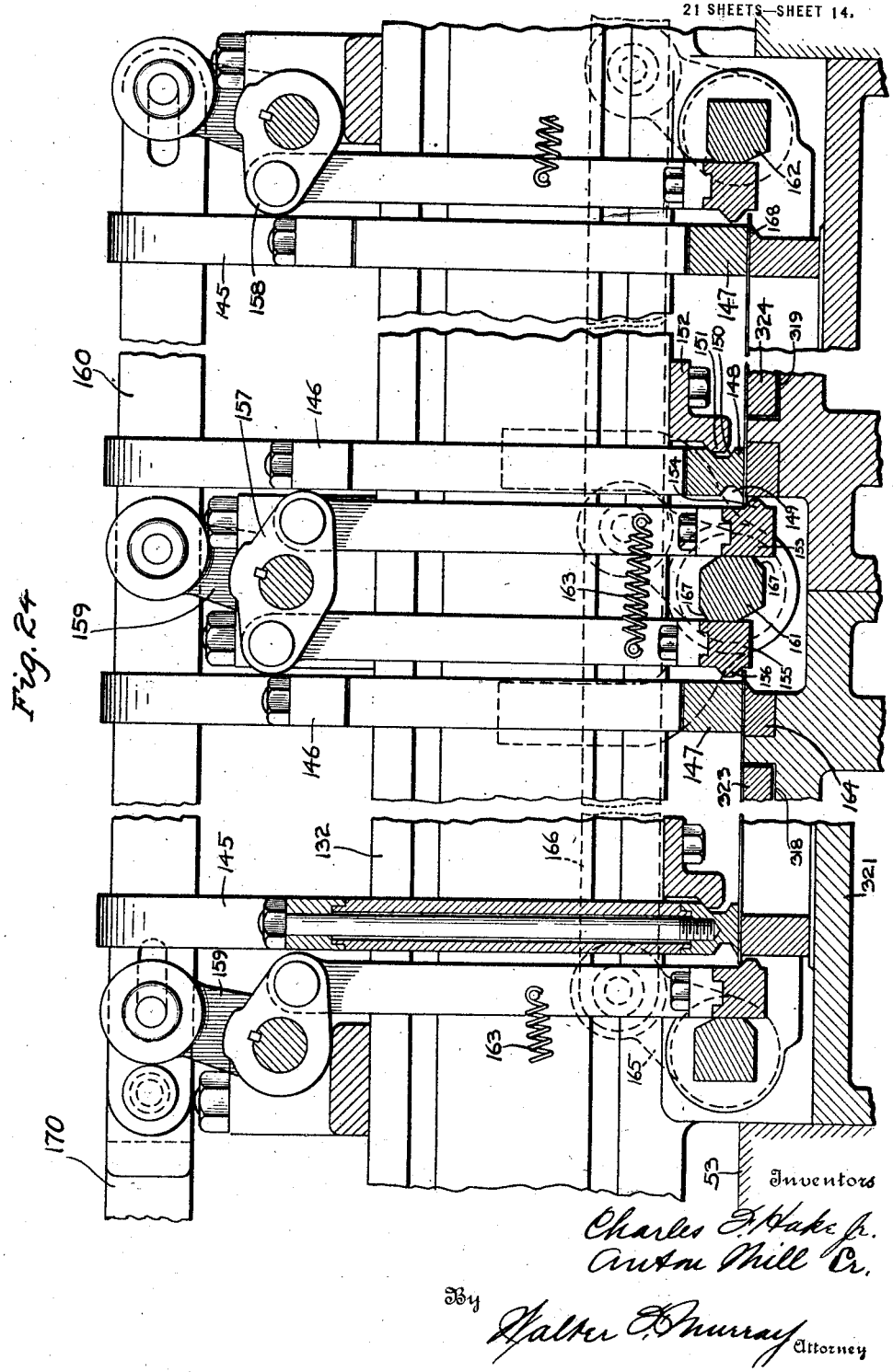

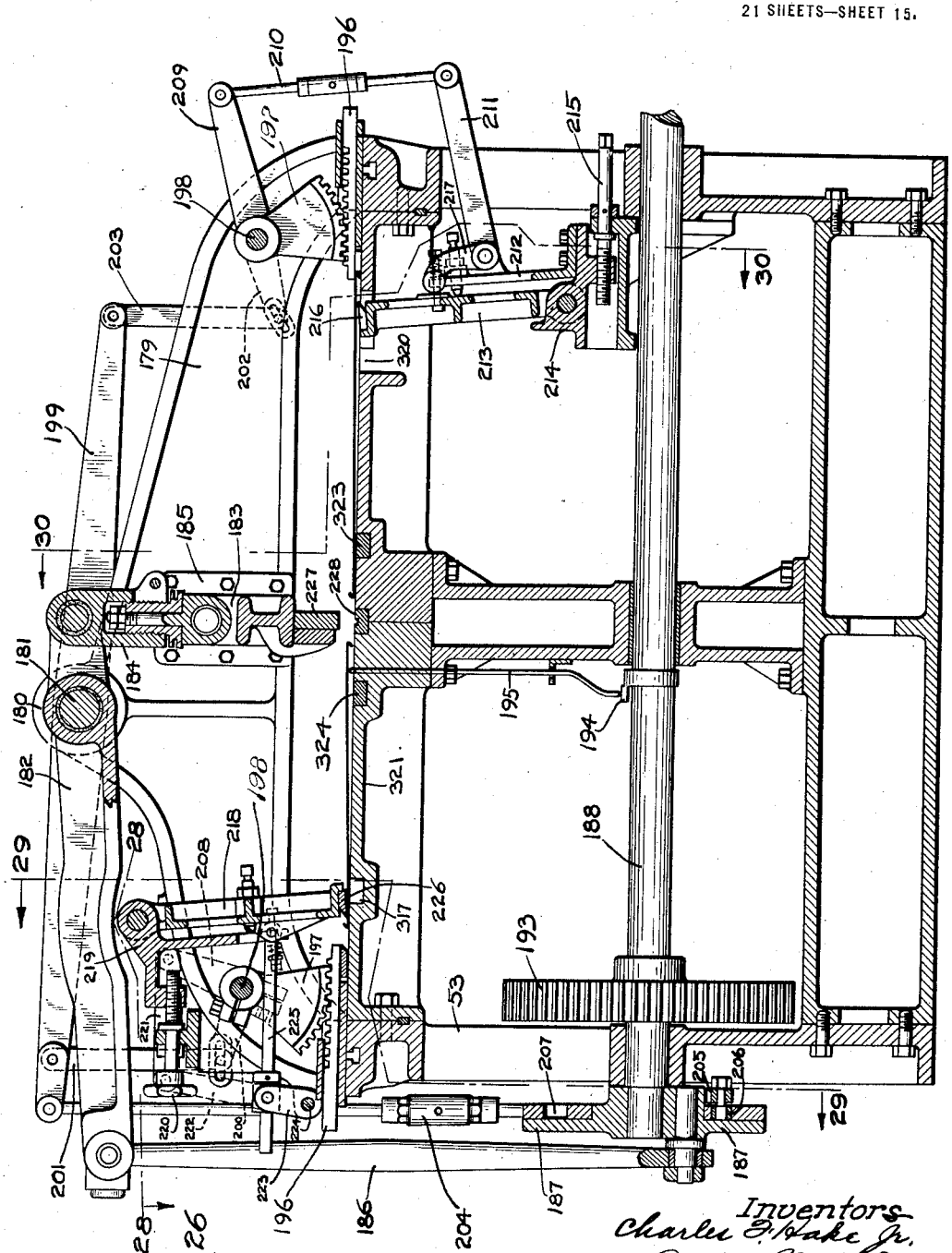

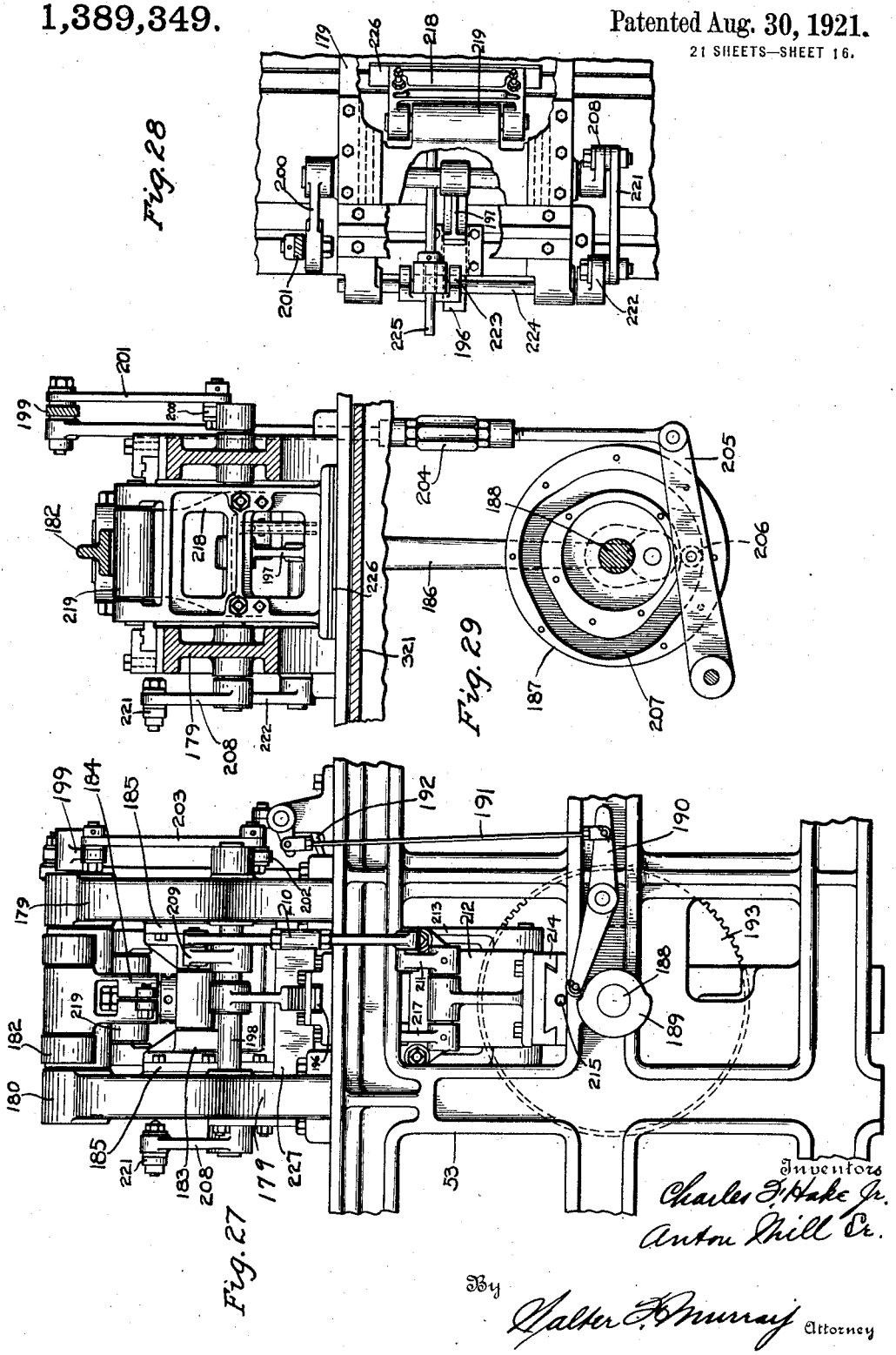

C. F. HAKE, Jr., AND A. MILL, Sr.
MACHINE FOR FORMING CAN BODIES.
APPLICATION FILED OCT. 14, 1919.
1,389,349.
Patented Aug. 30, 1921.
21 SHEETS—SHEET 17.
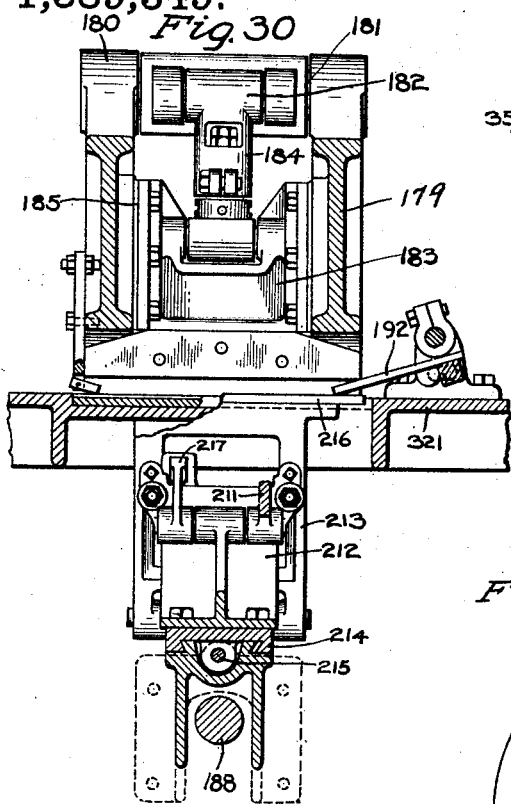
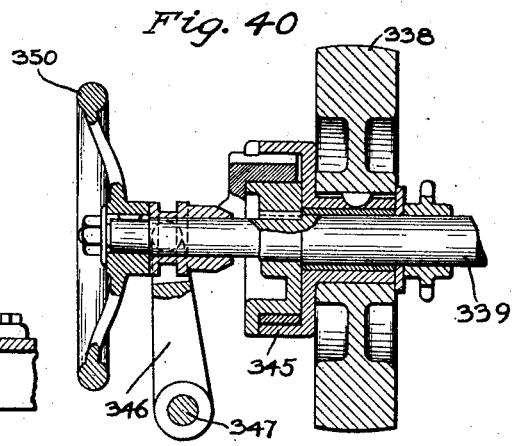
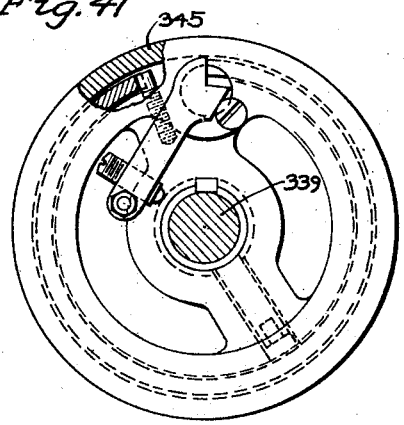
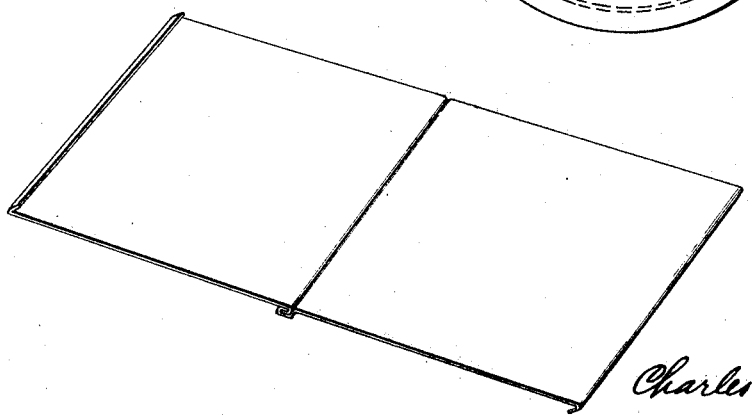

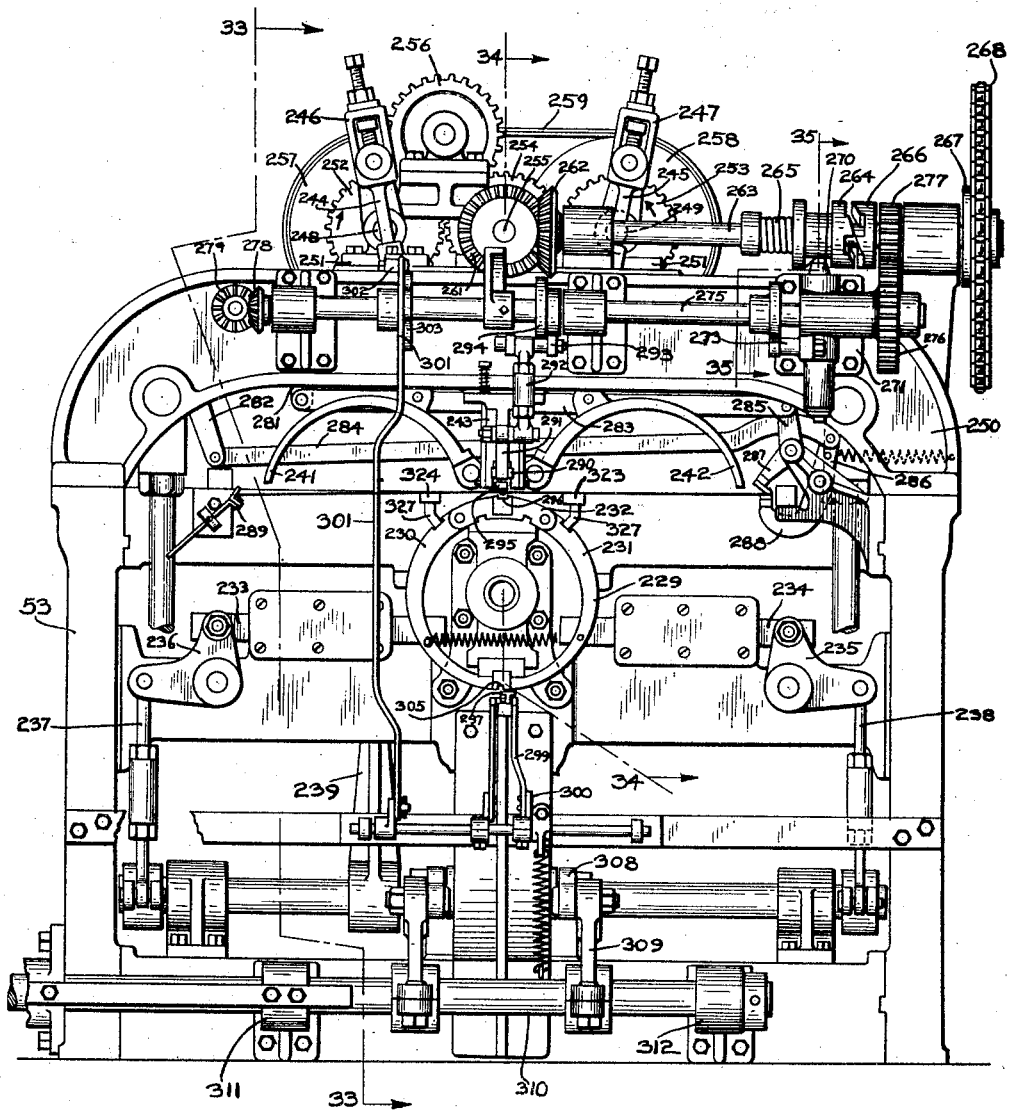

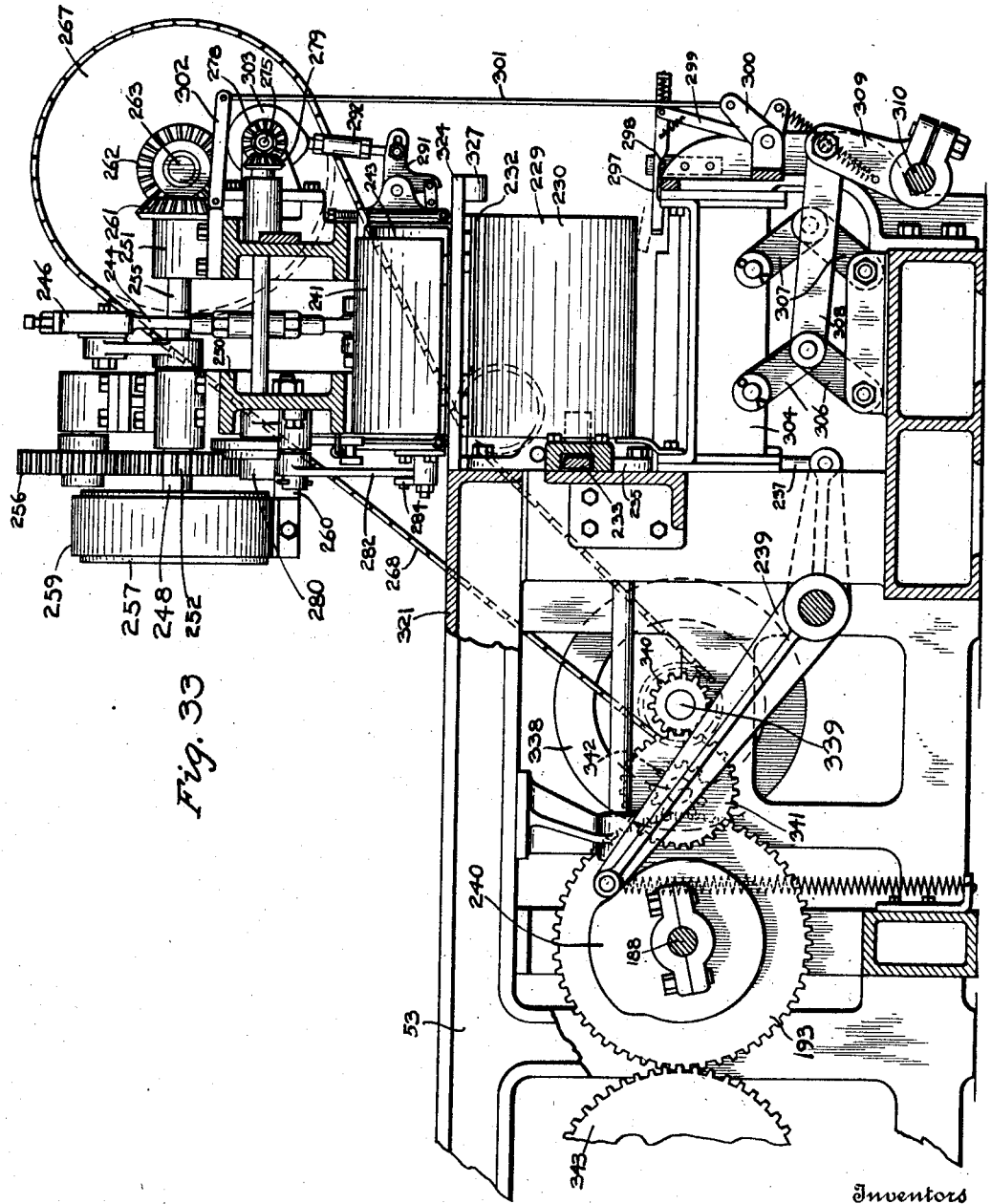

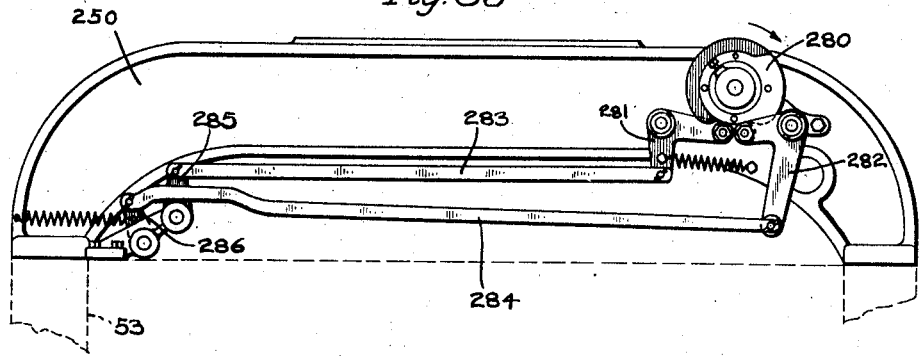
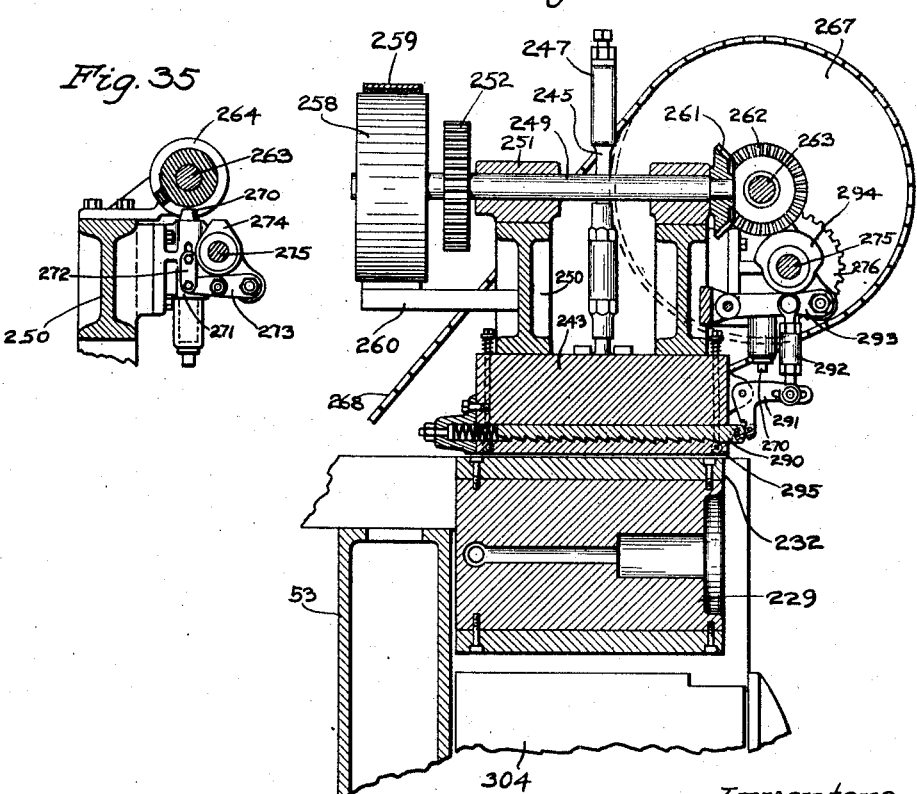

C. F. HAKE, Jr., AND A. MILL, Sr.
MACHINE FOR FORMING CAN BODIES.
APPLICATION FILED OCT. 14, 1919.
1,389,349.
Patented Aug. 30, 1921.
21 SHEETS—SHEET 21.
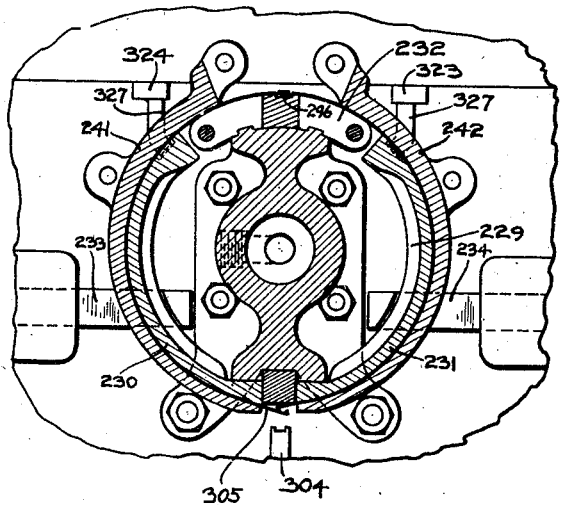
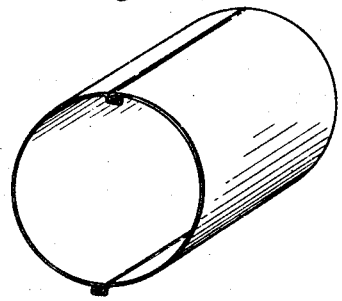
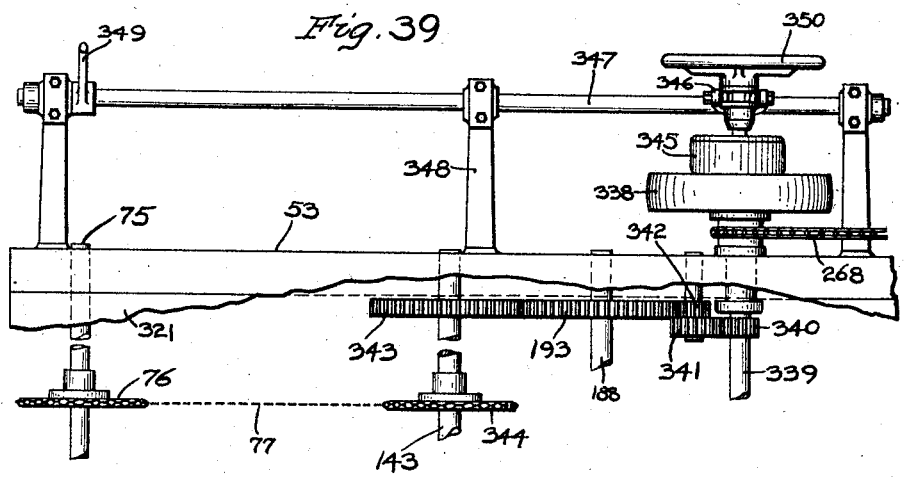

UNITED STATES PATENT OFFICE.

CHARLES F. HAKE, JR., AND ANTON MILL, SR., OF CINCINNATI, OHIO; SAID MILL ASSIGNOR TO SAID HAKE.

MACHINE FOR FORMING CAN-BODIES.

1,389,349.  Specification of Letters Patent.  Patented Aug. 30, 1921.

Application filed October 14, 1919. Serial No. 330,564.

*To all whom it may concern:*

Be it known that we, CHARLES F. HAKE, Jr., and ANTON MILL, Sr., citizens of the United States of America, and residents of Cincinnati, in the county of Hamilton and State of Ohio, have invented a new and useful Improvement in Machines for Forming Can-Bodies, of which the following is a specification.

Heretofore large can bodies have been formed from one sheet of metal. This, because of the increasing cost of sheet metal, as well as the difficulty encountered in obtaining sheets of large size in the gage required, has become objectional.

An object of our invention is to produce a machine for constructing can bodies of more than one piece of sheet metal, thereby reducing the cost of production.

A further object is to produce a machine for constructing can bodies having locked seams which produce a stronger can than has heretofore been practically possible in cans of large size.

These and other objects are attained by the machine described in the following specification and illustrated in the accompanying drawing, in which:—

Fig. 7, is a longitudinal fragmental section of the table of the machine, adjacent to the feeding mechanism, showing the means employed for operating the devices which carry the sheets through the machine.

Fig. 8, is a plan view upon a reduced scale, of the table and the sheet carrying devices in coöperation therewith.

Fig. 9, is a fragmental transverse sectional view of the table, sheet carrying devices, and operating means therefor, taken on the line 9—9 of Fig. 7.

Fig. 10, is a longitudinal fragmental sectional elevation of a sheet carrying device of the machine embodying our invention.

Fig. 11, is a fragmental side elevation of a portion of our machine, which we have chosen to call the corner clipping mechanism.

Fig. 12, is a plan view of the mechanism shown in Fig. 11.

Fig. 13, is a transverse sectional elevation of the mechanism shown in Fig. 12.

Fig. 14, is a fragmental sectional view taken on the line 14—14 of Fig. 12.

Fig. 15, is an end elevation of the corner clipping mechanism.

Fig. 16, shows two sheets which are used in the construction of a can body, the corners having been clipped off by means of the mechanism shown in Figs. 11 to 15 inclusive.

Fig. 17, is an end elevation of a portion of our machine, which we will call the edge bending mechanism.

Fig. 18, is a transverse sectional elevation through the machine upon the line 18—18 of Fig. 1, showing the edge bending mechanism.

Fig. 19, is a fragmental plan view of the machine, showing the edge bending mechanism.

Fig. 20, is a transverse sectional elevation through the machine upon the line 20—20 of Fig. 1, showing the edge bending mechanism from the opposite direction to that taken in Fig. 18.

Fig. 21, is a sectional view taken on the line 21—21 of Fig. 20.

Fig. 22, is a sectional elevation of the edge bending mechanism taken on the line 22—22 of Fig. 19.

Fig. 23, is a sectional elevation of the edge bending mechanism taken on the line 23—23 of Fig. 19.

Fig. 24, is a transverse sectional view through the machine, showing the action of the edge bending mechanism more clearly.

Fig. 25, is a perspective view showing the result of the action of the edge bending mechanism upon the sheets of which the body is constructed.

Fig. 26, is a transverse sectional view of the machine taken on the line 26—26 of Fig. 1, showing the seam forming mechanism.

Fig. 27, is a fragmental side elevation of the machine, showing an end view of the seam forming mechanism.

Fig. 28 is a fragmental sectional plan view of a portion of the seam forming mechanism taken on the line 28—28 of Fig. 26.

Fig. 29 is a sectional elevation taken on the line 29—29 of Fig. 26.

Fig. 30 is a sectional view taken on the line 30—30 of Fig. 26.

Fig. 31, is a perspective view of the sheets from which the can body is constructed, in joined condition, showing the result of the action of the seam forming mechanism.

Fig. 32, is an end elevation of the machine embodying our invention, looking at it from the delivery or discharge end and showing the body forming mechanism.

Fig. 33, is a fragmental sectional side elevation of the mechanism shown in Fig. 32, and taken on the line 33—33 thereof.

Fig. 34, is a fragmental sectional side elevation of the body forming mechanism, taken on the line 34—34 of Fig. 32.

Fig. 35, is a fragmental sectional view of a detail of our invention, taken on the line 35—35 of Fig. 32.

Fig. 36, is an elevational view of the sheet straightening mechanism employed in coöperation with the body forming mechanism.

Fig. 37, is a transverse section of the body forming drum, forming a detail of the body forming mechanism of our invention.

Fig. 38, is a perspective view of the can body after it has been completed by the machine.

Fig. 39, is a fragmental plan view of the driving mechanism of the machine.

Fig. 40 is a sectional view of the driving clutch of the machine.

Fig. 41 is an elevation of the driving clutch.

In the following description of our machine we will take up the different mechanisms and describe them separately, in order that the complete machine and its operation may be more easily understood. The several mechanisms in the order in which they will be described are as follows:—the sheet feeding mechanism A, the corner clipping mechanism B, the edge bending mechanism C, the seam forming mechanism D, and the body forming mechanism E.

Figure 3:
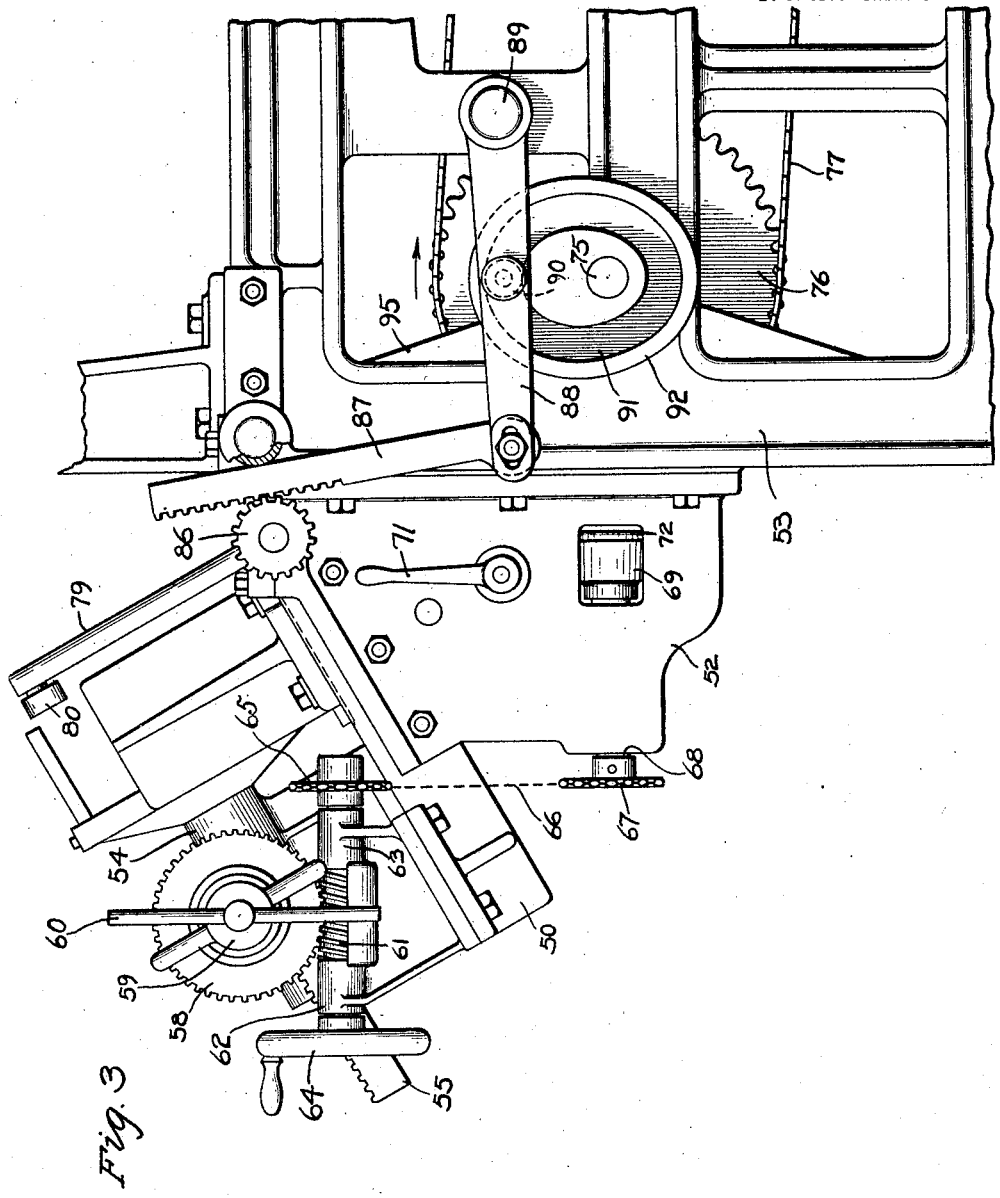
Fig. 3, is a fragmental side elevation of the feeding end of the machine, showing the mechanism for placing the sheets in position to be operated upon by the machine.
Figure 4:
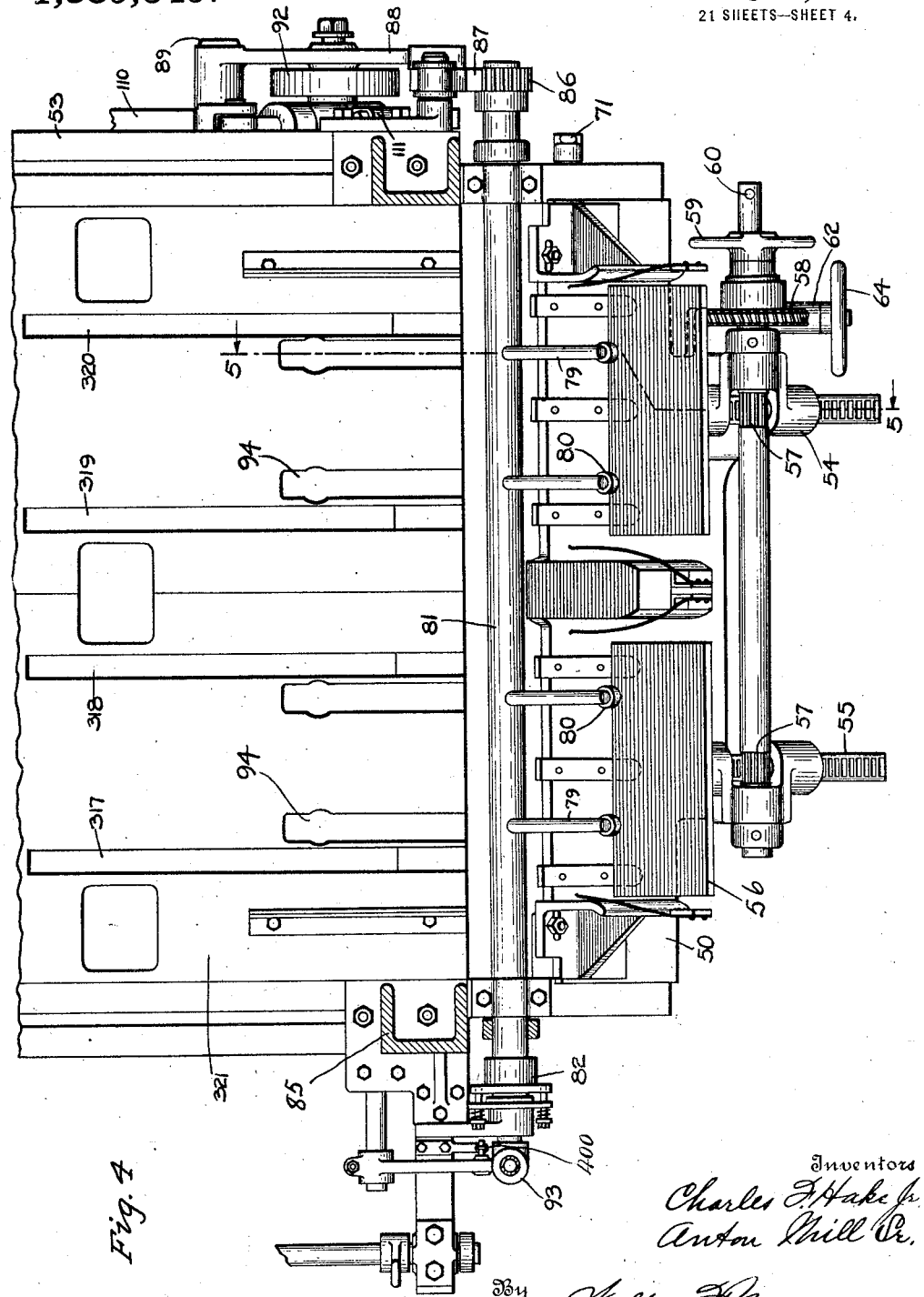
Fig. 4, is a plan view of the mechanism shown in Fig. 3.
Figure 5:
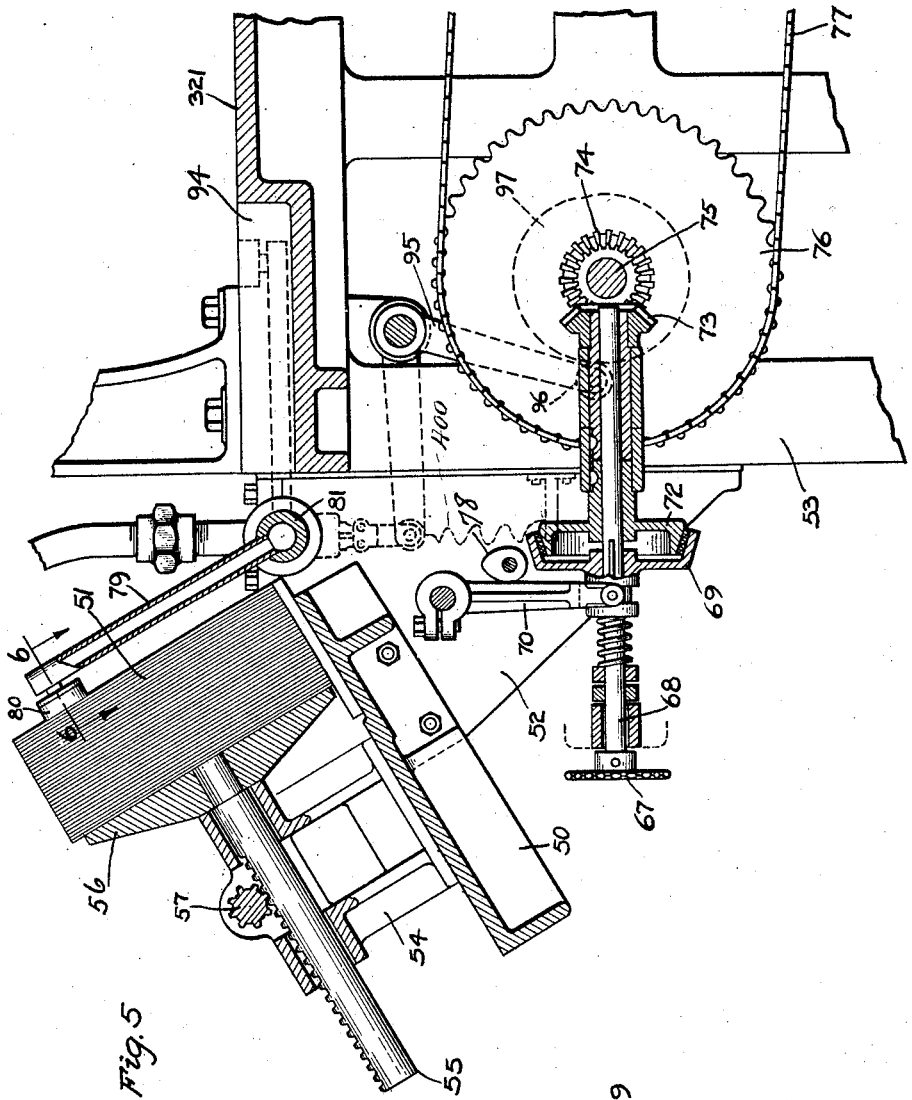
Fig. 5, is a fragmental longitudinal sectional view taken on the line 5—5 of Fig. 4.
Figure 6:
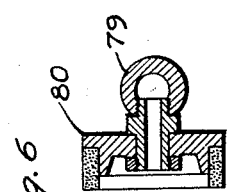
Fig. 6, is a sectional view of a detail of the machine, taken on the line 6—6 of Fig. 5.

The sheet feeding mechanism is illustrated clearly in Figs. 3, 4 and 5 and consists of the following coöperating elements. A table 50, which carries the sheets 51 from which the can bodies are made, is mounted in an inclined position upon brackets 52 secured to the frame 53 of the machine. Reciprocally mounted in brackets 54 extending from the table, are racks 55, at the forward ends of which, back plates 56 are mounted for supporting the packs of sheets 51. Pinions 57 are mounted on brackets 54 in coöperation with racks 55 for moving the packs forward as the sheets are removed therefrom. A worm gear 58 is mounted on the pinion shaft and may be operatively connected with the driving mechanism of the machine by means of a clutch 59, a handle 60 being used to rotate pinion 57 when the clutch is disengaged.

Meshing with worm gear 58 a worm 61, which is rotatively mounted between bearings 62 and 63 of bracket 54, is provided, a hand wheel 64 being provided for rotating the worm and thus operating the feeding mechanism, thus affording another means for operating the feed mechanism by hand. At the opposite end of the worm shaft a sprocket 65 is secured, which is connected by means of a chain, indicated by dotted lines 66, with a sprocket 67 mounted upon a shaft 68 which carries a clutch member 69 splined thereto and movable, by means of a fork 70 and hand lever 71 which controls a cam 78, into and out of engagement with a coöperating clutch member 72. Clutch member 72 is driven by a bevel gear 73 which meshes with a bevel gear 74 mounted upon a shaft 75 which is driven by a large sprocket 76 operatively connected by means of a chain 77 to other portions of the driving mechanism.

To remove the sheets one at a time from the pack 51, we have provided hollow arms 79 having suction cups 80 at their ends, the arms being mounted upon a hollow shaft 81 which communicates by means of a swivel joint 82 with a pipe 83 connected with a suction pump 84 (see Fig. 2), mounted upon standards 85. To operate the arms 79, we have provided a pinion 86 which is secured to the end of the hollow shaft and is rotated by a rack 87. This rack is operated by a lever 88, to one end of which it is connected, the opposite end 89 being pivotally connected with the frame, with a roller 90 mounted thereon between its ends and working in a groove 91 of a cam 92 mounted on shaft 75. A valve 93 is located in pipe 83 for opening and closing the pipe 81 to communication with the pump 84 at predetermined intervals of operation of the arms 79, so that the sheets may be removed from the packs 51 and released from the arms after the arms are brought to occupy the positions within recesses 94 of the top of the machine, as shown in dotted lines in Fig. 5. A bell crank lever 95, is provided for operating the valve, one arm of the lever being connected with the valve stem and the opposite arm having a roller 96 bearing against a cam 97 also mounted upon and driven by shaft 75.

A spring 400 operative upon the bell crank lever 95 serves to retain the roller 96 in engagement upon the cam 97. The spring also serves to retain the valve in a normally closed position. When the bell crank lever 95, see Fig. 5, is moved in a clockwise direction by the action of the cam 97, the valve is opened against the yielding pressure of the spring 400.

Figure 2:
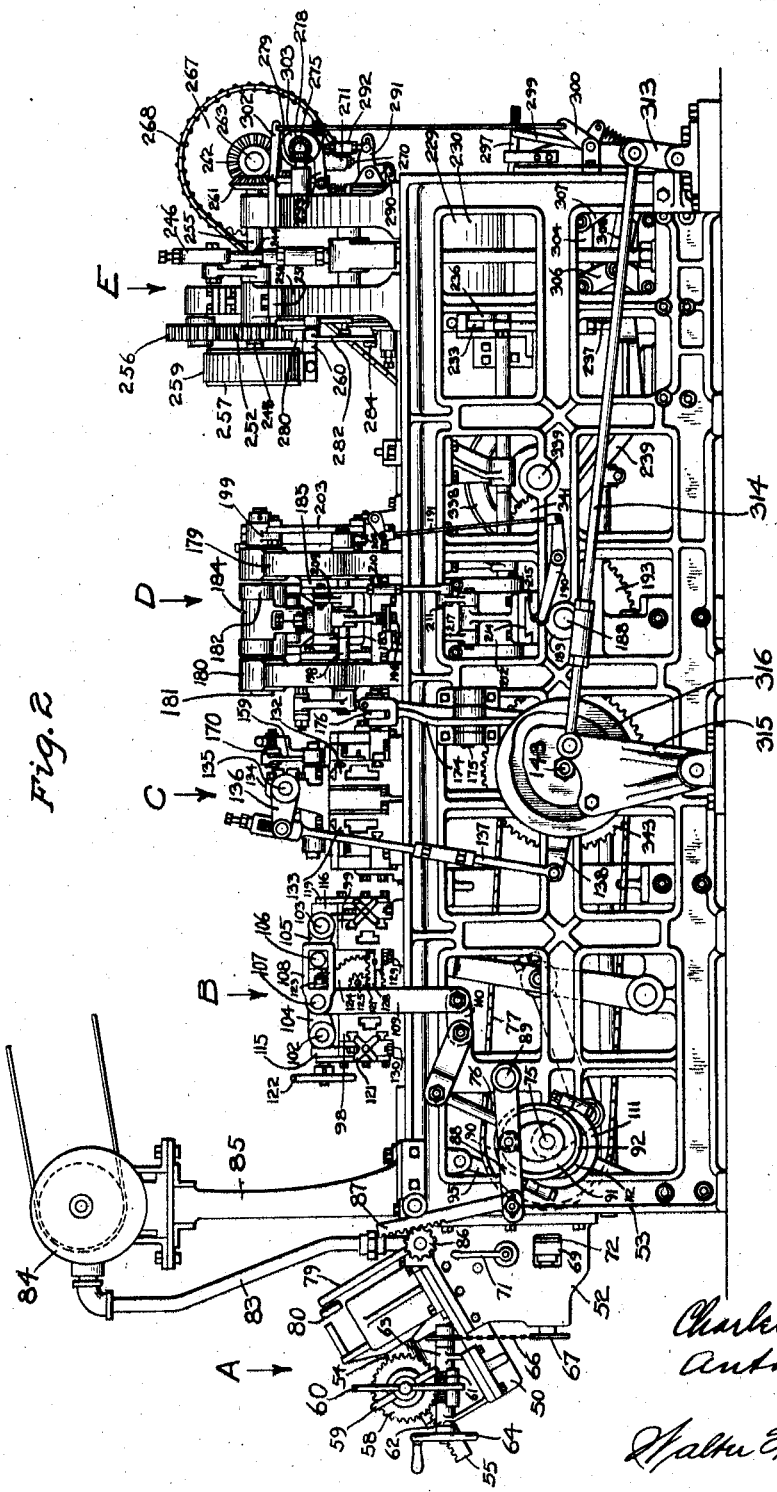
Fig. 2, is a side elevation of our improved machine, upon a reduced scale.

The next mechanism with which the sheets engage in their passage through the machine, is the corner clipping mechanism, which is generally designated in Fig. 2 by letter B. Figs. 11 to 16 inclusive, illustrate this portion of my machine in detail. Two transversely extending beams 98 and 99, which have bearings at the sides of the machine table, are provided for supporting the corner clipping mechanism. Journaled in bearings 100 and 101 on top of these beams, are shafts 102 and 103 which extend completely across the machine. Arms 104 and 105 are mounted at the ends of these shafts and have pins 106 and 107 which are connected by a link 108 having a downwardly extending arm 109, the lower end of which is connected with a lever 110 which is connected with an eccentric strap 111 operated by an eccentric 112 upon shaft 75. Shaft 102 is provided with a series of gear segments 113, and shaft 103 is provided with a like series of gear segments 114, the segments meshing respectively with the rack teeth of vertically movable cutter bars 115 and 116, having cutters 117 and 118 respectively mounted thereon for clipping the corners of the sheets as shown in Fig. 16. Each cutter bar is mounted in a housing 119 which is reciprocally mounted to be adjusted transversely of the machine by means of adjustment screws 120 and hand wheels 121. The central cutters shown in Figs. 12 and 13 are mounted in the housings 119 adapted to be adjusted transversely into beams 98 and 99 by means of the brackets 401 mounted upon the beams and through which extend adjustment screws 402 having square heads 403 formed thereon whereby the screws may be revolubly actuated in the brackets and thereby move the housings 119 upon the beams. The screws 402 engage adjustably in the lugs 404 mounted upon the housings 119. Another means which affords adjustment of the cutters longitudinally of the machine consists of the hand wheel 122 which rotates a worm 123 which in turn rotates a worm gear 124 secured to a shaft 125 extending across the machine and journaled in brackets 126 secured to beam 98. This shaft has a series of pinions 127 secured to it at intervals in position to engage racks 128 connected with beam 99. T headed bolts 129 are provided for permitting adjustment of beam 99 when loosened, and for securing it when tightened, bolts 130 performing the same function for beam 98. To guide the sheets properly into position with relation to the cutters, we have provided a series of bars 131.

Figure 1:
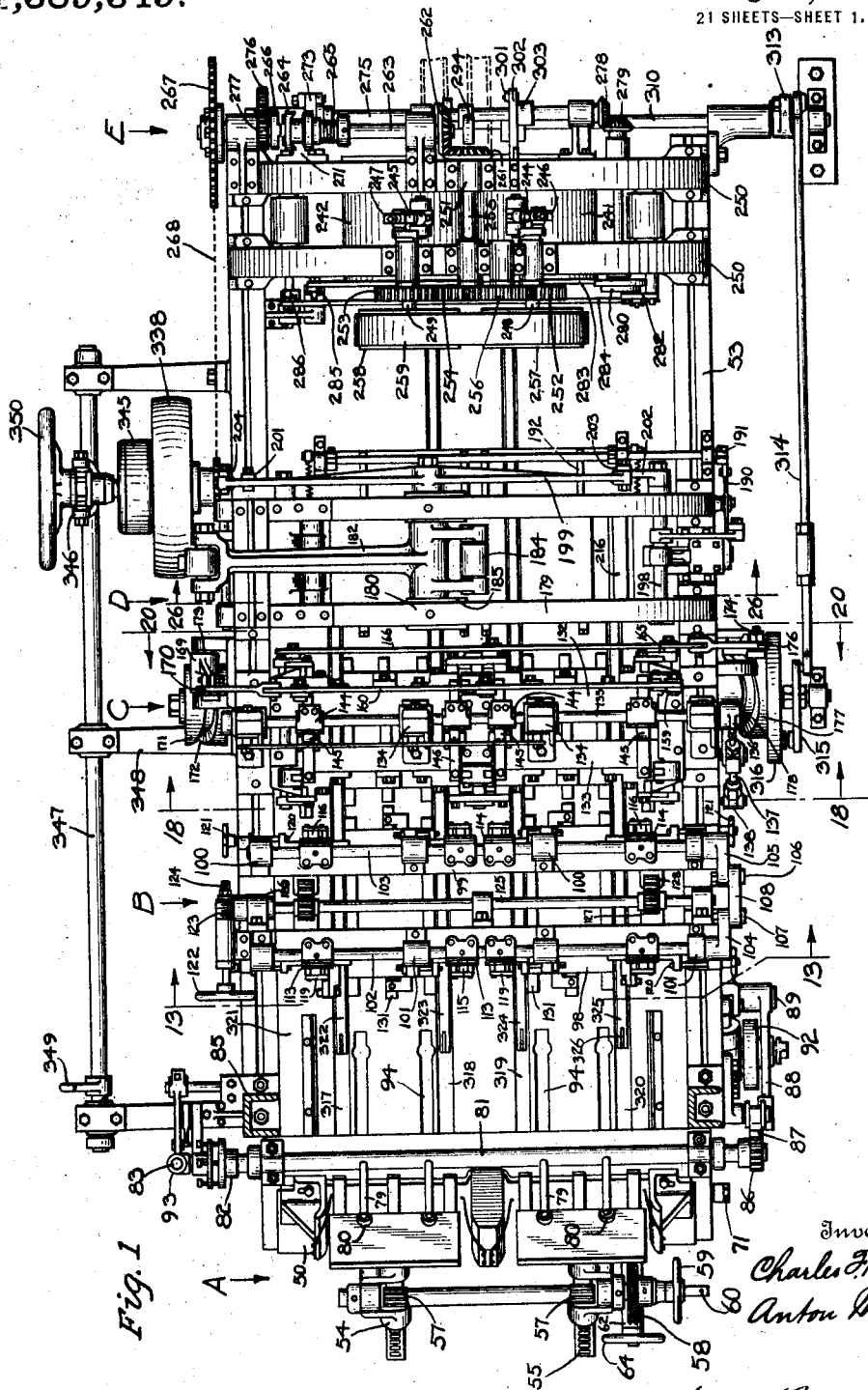
Figure 1, is a plan view of our improved machine, upon a reduced scale.

The next mechanism which the sheets encounter in their passage through the machine is the edge bending mechanism which we have indicated generally by C in Figs. 1 and 2. The detailed disclosure of this portion of our improved machine is found in Figs. 17, 18, 19, 20, 21, 22, 23, 24 and 25. Extending transversely of the machine and mounted upon the table are two transversely extendng beams 132 and 133, which are secured at their ends upon the sides of the table. Mounted upon these beams at intervals are a series of bearings 134 in which a shaft 135 which extends transversely of the machine, is mounted. This shaft is adapted to be rocked by an arm 136 which is connected with a link 137, the lower end of which is connected to a rocker arm 138 which is operated by an arm 139 having a roller 140 operating in the groove 141 of a cam 142. This cam is secured to a shaft 143 journaled in the side frame members of the machine. Secured to shaft 135 between the bearings, are a series of gear segments 144, the teeth of which mesh with the teeth of racks 145 extending above vertically movable frames 146 embracing the beams 132 and 133. These frames have presser bars 147 and 148 at their lower ends for engaging the sheets after they have been brought into position for the edge bending operation, in order to prevent their movement during the operation. Bars 147 are plain rectangular bars and are merely intended to clamp the sheet, but bars 148 are designed to perform the additional function of a form over which the edge of the sheet is bent, being provided with a groove 149 to receive the bent edge. To force the bar into position to have the edge of the sheet bent over it, we have provided a substantially V shaped groove 150 which coöperates with a nose 151 on a plate 152 secured to the beams 132 and 133. The action of this is to permit the bar to loosen itself from the bent edge of the sheet when the frame is raised.

After action of the clamping portion of the edge bending mechanism, the initial bending portion of the mechanism comes into operation. This consists of a series of bending bars 153 which are provided with noses 154, a series of bending bars 155, which are provided with noses 156, rocker arms 157 and 158, levers 159, and a transversely extending connecting link 160. Bars 153 and 155 bear at their back faces against angular shafts 161 and 162, springs 163, retaining them in this position, and when they are moved to sheet bending position the edges of the sheets will be bent upwardly at right angles by bars 153 over the edges of bars 148 to positions in front of grooves 149. The opposite edges of the sheets will be bent downwardly at right angles by bars 155 over the edges of undercut bars or forms 164 and the forms 164ª set into mounted upon or adjacent the table top. This action having been completed, the finish edge bending portion of the mechanism comes into operation. This operation is done by the angular shafts 161, 162, and their operating mechanism which consists of a series of levers 165 and their operating connecting link 166. This action of this finish bending device is to rock shafts 161 and 162, thereby bringing other faces 167 of the shafts, against the backs of the bars. These faces are at a greater distance from the centers of the shafts than the faces against which bars 153 and 155 bear during the initial bending operation. Therefore the bars are moved toward grooves 149 and toward the pointed edges 168 of forms 164, thus completing the edge bending movement by turning the edges of the sheets into grooves 149 and over edges 168 to produce the result shown in Fig. 25.

The means by which the link 160 is operated consists of a rocker arm 169 connected at its upper end to a short link 170 which is in turn connected to arm 169, and a cam 171 which coöperates with a roller at the lower end of the rocker arm and operating in groove 172 of cam 171, the rocker arm being pivoted between its ends at a point 173 upon the side of the frame. A similar construction is provided for operating link 166, a lever 174 which is pivoted at a point 175 and has its upper end connected by a link 176 to link 166, with its lower end having a roller coöperating with a groove 177 in a cam 178, being provided. Both cams are mounted on shaft 143 previously mentioned.

The sheets are now moved to proper position with relation to the seam forming mechanism which is generally designated in Figs. 1 and 2 by letter D. This mechanism is thoroughly illustrated in Figs. 26, 27, 28, 29, 30 and 31. Extending transversely across the table of the machine are deep beams 179 having bearings at the edges of the table. These beams are provided at points between their ends with bearings 180 in which a rocker shaft 181 is mounted, a rocker arm 182 being mounted between its ends on this shaft. The inner end of the rocker arm is connected with a cross head 183 by means of a short pitman 184, the cross head having reciprocal vertical movement between the beams 179 within ways 185 upon the inner faces of the beams. The outer end of the rocker arm is connected with a pitman 186 which is connected at its lower end with a crank disk 187 mounted on a shaft 188 extending transversely of the machine. The opposite end of the shaft is provided with a small cam 189 which in coöperation with a lever 190, which is connected with a rod 191, operates the sheet stops 192, shown in Fig. 27. These stops are brought to engage the table top, to act in alining the sheets when the lever 190 is operated by the elevation of cam 189, and when lifted by engagement of the lever with the depressed portion of the cam, to act to permit the sheets to pass. A gear 193 is mounted upon shaft 188 for driving the shaft. Between the sides of the frame a small cam 194 is mounted, a rod 195 extending vertically through the table, being operated by the cam for lifting the inner edge of one of the sheets as shown in Fig. 26.

At each side of the table, we have provided a rack bar 196 which is reciprocally mounted to be moved inwardly the inner edges of the bars being arranged to push the sheets toward one another to bring their inner bent edges into overlapping engagement with one another. These bars are operated by gear segments 197 which intermesh therewith and which are pivotally mounted at points 198 near the ends of the beams. A rocker arm 199 is pivotally mounted between its ends on the shaft 181, a lever 200 which is connected with the left hand segment 197 as viewed in Fig. 26, being connected with rocker arm 199 by a link 201. A lever 202 is connected with the right hand segment 197 and thence with the rocker arm by a link 203. The operation of rocker arm 199 is controlled by a link 204 which is connected with a lever 205 pivotally mounted at one end and having a roller 206 coöperating with a cam groove 207 formed on the back of the crank disk 187. The respective left and right hand gear segments 197 are also provided with lever extensions 208 and 209. Extension 209 is connected by means of a link 210 with a lever 211, which is pivoted on a bracket 212 and is adapted to operate a swinging plate 213. This plate is pivotally mounted at its lower end in a bracket 214 which is adjustable by means of a screw 215. The upper end of the plate is provided with an edge 216 adapted to enter the hooked outer edge of one of the sheets shown in Fig. 26, for a purpose to be hereinafter more fully described. An arm 217 which extends from lever 211, is yieldingly connected with plate 213 for a purpose to be hereinafter described. At the opposite side of the machine, a similar plate 218 to plate 213 is located, but in inverted position, it being located wholly above the table of the machine. A bracket 219 which is adjustable by means of an adjustment screw 220 is provided for mounting the plate pivotally. In order to operate the plate we have provided a link 221 which is connected with lever extension 208 of gear segment 197, this link being connected with a lever 222 which is pivoted at its lower end to a lug on one of the beams 179. A short lever 223 which is secured to a short shaft 224 to which lever 222 is connected, is connected to a rod 225 which at its inner end is yieldingly connected to plate 218 in the same manner that plate 213 is connected to arm 217. The lower end of plate 218 is provided with an edge 226, which like edge 216 is adapted to enter the hooked outer edge of the other of the sheets, as shown in Fig. 26.

Cross head 183 is provided with a presser foot 227 which in coöperation with a die 228 will form a seam, thus joining the two sheets as shown in Fig. 31. To place the sheets in position to form the seam, the racks 196 will push the inner hooked edges of the sheets into overlapping position. The edges 216 and 226 will then engage the outer hooked edges of the sheets and draw them apart until the inner hooked edges are hooked together over the opening in die 228. The foot 227 then presses the interhooked edges into the opening in the die and a seam, such as shown in Fig. 31, is formed.

The sheets having been joined, the next and last operation performed by the machine consists in passing the joined sheets into position to be operated upon by the body forming mechanism. This mechanism is designated generally by letter E in Figs. 1 and 2, and is illustrated in detail in Figs. 32 to 37 inclusive. Fig. 38 being a perspective view of the result of the operation of the body forming mechanism on the joined sheets.

The body forming mechanism is provided with a form 229 on which the joined sheets are adapted to be placed. The form is collapsible, the outer surface consisting of two wings 230 and 231 which are pivoted to a central core 232. Two hooked bars 233 and 234 are used to expand the wings, these bars being operated by bell crank levers 236 and 235 which are connected to links 237 and 238 connected to a lever 239 which is operated by a cam 240 on shaft 188. Over this form the joined sheets are placed, outer wings 241 and 242 being employed for folding the sheets over the form in order to place the hooked outer edges in overlapping position as shown in Fig. 37. These outer wings are pivoted to a block 243 depending from beams 250 and are operated by links 244 and 245 connected with cranks 246 and 247 mounted on shafts 248 and 249. These shafts are mounted in bearings 251 on top of beams 250 and upon the shafts are gears 252 and 253 adapted to drive them. A gear 254 upon a centrally located shaft 255, meshes directly with gear 253 for driving it, gear 252 being driven by a gear 256 intermediate between gears 252 and 254. The opposite ends of shafts 248 and 249 are provided with drums 257 and 258 around which a brake band 259 is placed, the opposite ends of which are yieldingly attached to a lug 260 extending from one of the beams 250. The effect of such a construction is to permit the gears 252 and 253 to be rotated in the direction of the arrows in Fig. 32, but to prevent reverse rotation thereof. To rotate drive shaft 255 we have provided a bevel gear 261 which meshes with a bevel gear 262 upon a shaft 263 which is provided with a clutch member 264. This clutch member is pressed toward a coöperating clutch member 266 by a spring 265, the clutch member 266 being adapted to drive the mechanism just described because of its direct connection with a driving sprocket 267 which is driven by a chain 268 extending to the main drive shaft 339 of the machine.

To operate clutch member 264, we have provided a pin 270 which is reciprocally mounted in a bracket 271. To the pin a link 272 is connected, the link being also connected with a lever 273 which is operated by a cam 274 upon a shaft 275 extending transversely across the face of one of the beams 250. A gear 276 on shaft 275, and which meshes with a gear 277 on shaft 263, is provided for driving shaft 275. The opposite end of shaft 275 is provided with a bevel gear 278 which in coöperation with another bevel gear 279 drives a cam 280, see Fig. 36. This cam operates two bell cranks 281 and 282 to which links 283 and 284, respectively, which are connected with cranks 285 and 286, are connected. Operated by these cranks are gripper fingers 287 and 288 which, as shown in Fig. 32, grasp one edge of the joined sheets. The opposite edge of the joined sheets is supported by an angle bracket 289. The object of the mechanism just described is to straighten the position of the joined sheets upon the form, as shown in Fig. 32. Mechanism for holding the joined sheets upon the form at the time the outer wings are brought down to fold the edges around the form, has been provided. This mechanism consists of a ratchet bar 290 which is connected by means of a bell crank 291 with a link 292, which is in turn connected with a lever 293 riding on a cam 294 mounted on shaft 275. Coöperating with the ratchet bar is a presser bar 295 which is adapted to press the central seam of the joined sheets into a groove 296 at the top of the core 232 of the form. In addition to this mechanism, we have provided means for straightening the ends of the sheet with relation to each other after the hook shaped edges have been interhooked. This mechanism consists of a rocking finger 297 which, riding over a pin 298, is connected with levers 299 and 300 to be rocked from the full line to the dotted line position shown in Fig. 33, by means of a link 301 which is connected with a lever 302 riding on a cam 303 on shaft 275.

Having thus been placed in proper position on the form, the interhooked edges at the bottom of the form are seamed together by means of a vertically reciprocating bar 304 which presses the interhooked edges of the sheets together and into a groove 305 in the bottom of the core 232 of the form. To operate the bar we have provided two pairs of toggle links 306 and 307 which are operated by a link 308 connected with a crank 309 upon a shaft 310 which is journaled in bearings 311 and 312 secured to the frame of the machine. To operate this shaft we have provided an arm 313 to which one end of a link 314 is connected, the opposite end of the link being connected with a rocker 315 which coöperates with a cam 316 upon shaft 143.

The mechanism for operating upon the sheets having now been described, there remains only one mechanism to be described. This is the conveying mechanism by means of which the sheets are carried through the machine into operative position with relation to the several mechanisms we have described above. This mechanism is illustrated separately from the mechanisms above described, in Figs. 7, 8, 9 and 10. Mounted in ways 317, 318, 319 and 320, which extend longitudinally of the table 321 of the machine, are the respective conveyer bars 322, 323, 324 and 325. Bars 322 and 325 extend only to the seam forming mechanism and bars 323 and 324 extend entirely throughout the length of the machine. Each of the bars is provided with a series of fingers 326 which are held in elevated positions, as shown in Fig. 10, by a spring 327 provided for each finger, the recesses which contain the fingers, being of a depth sufficient to permit the hooked ends 328 to be pressed beneath the top surfaces of the bars in their backward movement. At their feeding ends the bars are each provided with a block 329 which is connected with a spacer 330 having links 331 connected at its ends, which are in turn connected with rocker arms 332 mounted on a shaft 333 extending transversely of the machine and mounted in bearings 334 located at the bottom of the frame of the machine. Between the upper and lower ends of the rocker arms one end of a link 335 is connected, the opposite end being connected to a crank 336 secured to the inner end of shaft 75.

In its operation the swinging action of arms 79 places two sheets of sheet metal upon the machine table between the first two fingers 326 of the bars. The reciprocation of the bars moves the sheets to position beneath the corner clipping mechanism whose operation has previously been described. The sheets are left in this position and during the return movement of the bars the corner clipping operation is performed. Upon their complete return, additional sheets are placed upon the bars in position to be fed through the machine. The first pair of sheets are moved to position to be operated upon by the edge bending mechanism at the next feeding operation of the bars, the second pair of sheets having simultaneously been moved to position to be operated upon by the corner clipping mechanism. The bars again return and a third pair of sheets is placed in position to be moved forward at the next feeding movement of the bars, which also carries the first and second pairs forward another step, the first pair being moved during this movement to position to be operated upon by the seam forming mechanism, the second pair being moved simultaneously to the edge bending mechanism, with the third pair occupying position to be operated upon by the corner clipping mechanism. The next operation of the bars moves the sheets to their respective next positions, a new pair of sheets having been started through the machine. However, the first pair of sheets, which have just passed through the seam forming mechanism, are moved to an open space on the machine table, only the central bars 318 and 319 now operating to carry the joined sheets from the seam forming mechanism through the remainder of the machine.

This operation of the bars is then followed by the movement which carries the joined sheets onto the form 229 in preparation for the body forming operation. The body forming mechanism having completed its operation the can body thus formed is pushed from the form by the extended ends of bars 318 and 319 which carry downwardly extending lugs 327 for this purpose, as shown in Fig. 37.

To drive the machine we have provided a main driving pulley 338 which is rotatively mounted on the main drive shaft 339 extending transversely of and mounted in bearings on the frame of the machine. Geared to shaft 339 by means of gears 340, 341, 342 and 193 is shaft 188 which operates the seam forming mechanism and driven from shaft 339 by means of chain 268 is the large sprocket 267 which operates the principal elements of the body forming mechanism. Gear 193 upon shaft 188 meshes in turn with a gear 343 upon shaft 143 to drive the edge bending mechanism. Upon the shaft 143 we have provided a large sprocket 344 which by means of chain 77 drives sprocket 76 from which the corner clipping and sheet feeding mechanisms are operated. In order that the driving power may be disconnected from the machine, we have provided a clutch 345 which is adapted to connect and disconnect the driving pulley 338 and drive shaft 339. This clutch is illustrated in detail in Figs. 40 and 41, and is arranged to be operated by a yoke 346 which is mounted upon a rock shaft 347 journaled in bearings 348, extending from the frame of the machine. A handle 349 is provided for operating the rock shaft to throw the clutch into and out of operative condition. In order that the machine may be operated slowly by hand when the clutch is disconnected, we have provided a hand wheel 350 which is keyed to shaft 339.

Further and more detailed description of the operation of the different elements of the mechanisms we have previously described, is deemed unnecessary in view of the operation descriptions occuring in the sections of the foregoing specification which relate to the different mechanisms, the sequential operation of the different mechanisms also having been described above.

Therefore, having thus described our invention, what we claim is:—

1. In a can-body forming machine the combination of a feeding mechanism adapted to feed two sheets of metal side by side in a longitudinal direction, a mechanism adapted to bend a flange upon each longitudinal edge of the sheets, a mechanism adapted to interlock the adjacent flanges, a mechanism adapted to roll the sheets thus interlocked into a cylindrical form and a mechanism adapted to interlock the flanges made adjacent by thus rolling the interlocked sheets.

2. In a can-body forming machine the combination of a feeding mechanism adapted to feed two sheets of metal side by side, in a longitudinal direction, a mechanism adapted to cut off the corners of the sheets, a mechanism adapted to bend a flange upon each longitudinal edge of the sheets, a mechanism adapted to interlock the adjacent flanges, a mechanism adapted to roll the sheets thus interlocked into a cylindrical form and a mechanism adapted to interlock the flanges made adjacent by thus rolling the interlocked sheets.

3. In a machine for forming can-bodies the combination of a means adapted to feed two sheets at a time and side by side through the machine, a mechanism adapted to bend the adjacent edges of the sheets in opposite directions and to bend the outer edges thereof in opposite directions, to form flanges, a mechanism adapted to develop the sheets into a form wherein the outer edge of the sheets engage, and a mechanism adapted to interlock the flanges on one sheet upon the flanges of the other sheet.

4. In a machine for forming can-bodies the combination of a feeding mechanism adapted to feed two sheets longitudinally side by side, a mechanism adapted to bend an upturned and a downturned longitudinal flange upon each sheet, a mechanism adapted to move the sheets first toward and then from each other to interlock adjacent flanges, a mechanism adapted to flatten the interlocked flanges, a mechanism adapted to curve the interlocked sheets to a position in which the outer flanges overlap and a mechanism adapted to interlock and to flatten these outer flanges.

5. In a can-body-forming machine the combination of a mechanism adapted to feed sheets of metal side by side longitudinally, a mechanism adapted to cut off the corners of the sheets, a mechanism adapted to form a down-turned flange upon the inner edge of one and upon the outer edge of the other sheet and upturned flanges vice versa, a mechanism adapted to develop the sheets into a form wherein the outer edges of the sheets engage, and a mechanism adapted to interlock the upturned flanges with the down-turned flanges.

6. A machine comprising means adapted to simultaneously present a series of sheets of metal to a feeding mechanism, to feed a second series of sheets of metal through the machine, to form flanges upon the edges of a third series, to interlock adjacent edges of a fourth series, to curve a fifth series into cylindrical form and to interlock the outer edges of a sixth series.

7. A corner clipping mechanism for sheets for forming can bodies, comprising a frame, a conveyer for the sheets mounted in the frame, cutter bars, means adapted adjustably to mount the cutter bars upon the frame comprising longitudinal ways upon the frame, beams mounted reciprocally upon the ways and having longitudinal ways in them, housings mounted reciprocally upon the ways in the beams and having ways adapted to mount the cutter bars, means for adjusting the beams and the housings upon their respective ways, and means for actuating the cutter bars.

8. An edge bending mechanism for the sheets of a can-body forming machine comprising a table, a conveyer adapted to feed forward intermittently two sheets side by side upon the surface of the table, longitudinal undercut forms mounted two below and two above the surface of the table adjacent to the positions of the edges of the sheets, the adjacent forms being one above and one below the surface, and coöperating forms adapted to bend the edges of the sheets over the undercut forms.

9. In an edge bending mechanism for the sheets of can-body forming machines the combination of a table, a conveyer adapted to feed forward intermittently two sheets side by side upon the surface of the table, a clamping mechanism adapted to hold these sheets during the edge bending operation and comprising two sets of four bars, each set having two bars having acute bend forming edges, said acute edges being alternately above and below the surface of the table, and vertically movable bars adapted to bend the opposite edges of a sheet over said acute edges.

10. A seam forming mechanism for a can-body-forming machine comprising a mechanism adapted to form an upturned and a downturned longitudinal edge upon adjacent sheets of metal, a conveyer adapted to feed the sheets intermittently upon the table, a central longitudinal die in the table, a coöperating presser foot above the die, pushers adapted to cause the inner edges of the sheets to overlap, arms adapted to engage the bends upon the outer edges of the sheets and to draw the sheets outward and to interlock the inner bends of the sheet and means for depressing the presser foot upon and to carry the interlocked edges into the die.

11. In a can-body-forming machine the combination of a table, a conveyer adapted to feed two sheets side by side upon the table, an edge bending mechanism supported upon the table and comprising means adapted to form an upturned and a downturned flange upon the longitudinal edges of the sheets and a seam forming mechanism mounted upon the table adjacent to the edge bending mechanism and comprising means adapted to move the sheets to a position in which their inner edges overlap, means adapted to move the sheets outward to cause the inner flanges to interlock and a clamp adapted to flatten the interlocked flanges.

12. A mechanism for forming a can-body from two sheets which are joined by a central seam and have coöperating flanges upon their outer edges comprising an expansible form having a longitudinal groove adapted to receive the seam, grippers adapted to engage an outside edge of the sheets and to move them to bring the seam in registry with the longitudinal groove, wings adapted to fold the sheet about the form and to cause the edges to overlap, means adapted to expand the form and cause the flanges to interlock and means adapted to flatten the interlocked flanges.

13. A mechanism for forming a can-body from two sheets which are joined by a central seam and have coöperating flanges upon their outer edges comprising an expansible form having a longitudinal groove adapted to receive the seam, wings adapted to fold the sheet about the form and to cause the edges to overlap, means adapted to straighten the overlapped edges, means adapted to expand the form and cause the flanges to interlock and means adapted to flatten the interlocked flanges.

14. A mechanism for forming a can-body from two sheets which are joined by a central seam and have coöperating flanges upon their outer edges comprising an expansible form having a longitudinal groove adapted to receive the seam, grippers adapted to engage an outside edge of the sheets and to move them to bring the seam in registry with the longitudinal groove, wings adapted to fold the sheet about the form and to cause the edges to overlap, means adapted to straighten the overlapped edges, means adapted to expand the form and cause the flanges to interlock and means adapted to flatten the interlocked flanges.

15. In a can-body-forming machine the combination of a feeding mechanism adapted to feed a plurality of sheets of metal through the machine, a mechanism to bend coöperating flanges upon the edges of the sheets, means disposing the sheets adjacently to one another, a mechanism adapted to interlock a flange on each sheet of metal upon a flange of the next adjacent sheet of metal, a mechanism adapted to roll the sheets thus interlocked into a cylindrical form whereby flanges formed on two sheets of the metal are moved to positions immediately adjacent one another, and a mechanism adapted to interlock the flanges made adjacent by thus rolling the interlocked sheets.

In testimony whereof, we have hereunto subscribed our names this 9th day of October, 1919.

CHARLES F. HAKE, Jr.
ANTON MILL, Sr.